(12) United States Patent
Bhatnagar et al.

(10) Patent No.: US 11,499,802 B2
(45) Date of Patent: Nov. 15, 2022

(54) VARIABLE AREAL DENSITY CROSS-PLIED FIBER-REINFORCED COMPOSITE BALLISTIC MATERIAL

(71) Applicant: HONEYWELL INTERNATIONAL INC., Morris Plains, NJ (US)

(72) Inventors: Ashok Bhatnagar, Richmond, VA (US); Gregory A. Davis, Midlothian, VA (US); David Andrew Steenkamer, Midlothian, VA (US); Lori L. Wagner, Richmond, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 922 days.

(21) Appl. No.: 16/162,628

(22) Filed: Oct. 17, 2018

(65) Prior Publication Data

US 2019/0128648 A1 May 2, 2019

Related U.S. Application Data

(60) Provisional application No. 62/578,577, filed on Oct. 30, 2017.

(51) Int. Cl.
*F41H 5/04* (2006.01)
*B32B 5/02* (2006.01)
*F41H 1/02* (2006.01)

(52) U.S. Cl.
CPC ......... *F41H 5/0485* (2013.01); *F41H 5/0492* (2013.01); *B32B 5/022* (2013.01); *B32B 2571/02* (2013.01); *F41H 1/02* (2013.01)

(58) Field of Classification Search
CPC ........ F41H 5/0485; F41H 5/0492; F41H 1/02; B32B 2571/02; B32B 3/263; B32B 5/12;
(Continued)

(56) References Cited

U.S. PATENT DOCUMENTS 5,061,545 A 10/1991 Li et al.
5,254,383 A 10/1993 Harpell et al.
(Continued)

FOREIGN PATENT DOCUMENTS

BE 1014614 1/2004
WO 2013092626 6/2013
(Continued)

OTHER PUBLICATIONS

Extended European Search Report for EP18871854.
International Search Report for PCT/US2018/057705.

*Primary Examiner* — Peter Y Choi
*Assistant Examiner* — Jenna N Chandhok
(74) *Attorney, Agent, or Firm* — Roberts & Roberts, LLP; Richard S. Roberts, Jr.

(57) ABSTRACT

This technology relates materials that are stab, spike and ballistic resistant and to stab, spike and ballistic resistant composite articles incorporating uniaxially oriented, nonwoven fabrics. A fabric layer having a non-uniform areal density is formed having thick areas and thin areas, the thick areas having a greater filament/tape concentration compared to the thin areas. In said thick areas, agglomerated tapes/filaments will protrude from the fabric layer surface. Additional layers are then adjoined with the non-uniform layer to form a panel that has stab, spike and ballistic resistance, with protrusions at least partially spacing the additional layers from full, direct contact with the surface of the non-uniform fabric layer to thereby enhance flexibility and stab, spike and ballistic resistance of the whole.

20 Claims, 5 Drawing Sheets

(58) Field of Classification Search
CPC ......... B32B 5/26; B32B 3/30; B32B 2307/52; B32B 2307/516; B32B 2307/732; B32B 5/028; B32B 5/022
See application file for complete search history.

(56) References Cited

U.S. PATENT DOCUMENTS

| | | |
|---|---|---|
| 5,668,344 A | 9/1997 | Bornstein |
| 7,601,416 B2 | 10/2009 | Palley |
| 2005/0059307 A1 | 3/2005 | Moeseke |
| 2008/0119099 A1* | 5/2008 | Palley ................ B32B 5/02 442/134 |
| 2014/0087124 A1* | 3/2014 | Carbajal ............. B32B 5/022 428/111 |
| 2017/0030686 A1 | 2/2017 | Rockenfeller et al. |

FOREIGN PATENT DOCUMENTS

| | | |
|---|---|---|
| WO | 2014197039 | 12/2014 |
| WO | 2017081693 | 5/2017 |

* cited by examiner

VARIABLE AREAL DENSITY CROSS-PLIED FIBER-REINFORCED COMPOSITE BALLISTIC MATERIAL

CROSS-REFERENCE TO RELATED APPLICATION

This application claims the benefit of U.S. Provisional Application Ser. No. 62/578,577, filed on Oct. 30, 2017, the disclosure of which is incorporated by reference herein in its entirety.

BACKGROUND

Technical Field

This technology relates to materials that are stab, spike and ballistic resistant and to stab, spike and ballistic resistant composite articles incorporating uniaxially oriented, non-woven fabrics.

Description of the Related Art

High tenacity fibers, such as SPECTRA® polyethylene fibers, are known to be useful for the formation of articles having excellent ballistic resistance. Ballistic resistant articles formed from high tenacity tapes are also known. Articles such as bullet resistant vests, helmets, vehicle panels and structural members of military equipment are typically made from fabrics comprising high tenacity fibers or tapes because of their very high strength to weight performance. For many applications, the fibers or tapes may be formed into woven or knitted fabrics. For other applications, the fibers or tapes may be coated with a polymeric matrix material and formed into non-woven fabrics. In one common non-woven fabric structure, a plurality of unidirectionally oriented fibers are arranged in a generally coplanar, coextensive relationship and coated with a binding matrix resin to bind the fibers together. Typically, multiple plies of such unidirectionally oriented fibers are merged into a multi-ply composite. See, for example, U.S. Pat. Nos. 4,403,012; 4,457,985; 4,613,535; 4,623,574; 4,650,710; 4,737,402; 4,748,064; 5,552,208; 5,587,230; 6,642,159; 6,841,492; and 6,846,758, all of which are incorporated herein by reference to the extent consistent herewith.

Composites fabricated from non-woven fabrics are known to stop projectiles better than woven fabric composites because the component fibers in non-woven fabrics are not crimped like the fibers in woven materials. Fiber crimping reduces the ability of the fibers to stay in tension and immediately absorb the energy of a projectile, compromising their effectiveness. In addition, projectile damage to non-woven fabrics is more localized compared to woven fabrics, allowing for enhanced multi-hit performance. However, woven composites are known to be more stab and spike resistant than traditional non-woven fabrics formed from parallel fiber arrays because the mechanically interlocking woven fabric structure creates superior friction that is better at preventing blades from piercing through the fabric.

Nevertheless, woven stab/spike resistant fabric articles of the related art remain imperfect. Such woven fabrics require a very tight weave (i.e. a pick count of greater than 56×56 per inch) so that the fabric or fabric layers will not shift on blade impact and to create sufficient friction to prevent the blade from piercing the fabric, or require coatings of heavy materials such as ceramics, cermets or shear thickening fluids. Creating woven fabrics of such high density requires the use of very fine, low denier per filament (dpf) yarns/yarn bundles that are expensive to manufacture and difficult to weave. Depending on the fiber type, such low dpf yarns also have comparatively low breaking strength relative to higher dpf yarns and therefore they are less effective at preventing backface deformation when used to form ballistic resistant composite articles. Also, the use of such fine yarns typically requires that they be highly twisted and/or highly commingled to be processed into fabrics, but the fine yarns are delicate and often break during twisting or commingling, keeping productivity low. Composites formed from twisted fibers are also less effective at stopping bullets or other projectiles than composites formed from untwisted fibers. Fabrics that require coatings also have drawbacks, such as reduced flexibility or undesirable added weight. Accordingly, there is an ongoing need in the art for improved ballistic resistant composites having both superior stab and spike resistance and superior ballistic resistance. The present technology provides a solution to this need.

SUMMARY OF THE DISCLOSURE

It has been unexpectedly discovered that non-woven fabric materials comprising two or more coupled layers of uniaxially oriented fibers can be fabricated into effective stab, spike and ballistic resistant composite materials. The coupled layers may be attached to each other by methods such as stitching, e.g., tack stitching, or by tack bonding (i.e., localized attachment or bonding of zones or portions of the combined layers rather than bonding the layers together along the entire area of their contacting surfaces) such that they are not fixed in position relative to each other along their entire surface(s), or the coupled layers may be loosely positioned together without any form of attachment, being held together within a pouch (e.g., fabric pouch of rip-stop nylon) or polymeric envelope. Each of these embodiments will allow the layers to shift in response to a stabbing impact from a sharp object, such as a knife blade. One or each of the coupled layers has a non-uniform areal density, having thick areas and thin areas, where the thick areas protrude from at least one of the fabric surfaces, thereby at least partially spacing the coupled layers from each other and further enhancing article flexibility.

Particularly, the disclosure provides a non-woven, stab, spike and ballistic resistant panel comprising a plurality of adjoined non-woven fabric layers, each of said fabric layers comprising a plurality of axially (unidirectionally) oriented fibers and wherein at least one of said fabric layers is a non-uniform layer having a non-uniform thickness, wherein said non-uniform layer has thick areas and thin areas, wherein the areal density of said thick areas is greater than the areal density of said thin areas, wherein each non-uniform layer has a front surface and a rear surface, wherein each of said thick areas individually protrude from at least one of said surfaces and at least partially separates two layers from each other when the protrusions are located between said two layers.

Also provided is a stab, spike and ballistic resistant article comprising a first panel and a second panel connected to the first panel, the first panel comprising two coupled fabric layers, said coupled fabric layers comprising a first non-woven, non-uniform fabric layer and a second non-woven, non-uniform fabric layer that are coupled together whereby they are not fixed in position relative to each other, wherein said coupled fabric layers have opposing surfaces that are at least partially spaced from each other by said protruding thick areas between said coupled fabric layers, and the second panel comprising a plurality of fabric layers, said plurality of fabric layers being consolidated; each of the fabric layers comprising a plurality of fibers, said fibers having a tenacity of about 7 g/denier or more and a tensile modulus of about 150 g/denier or more; each of said fibers having a surface, and the surfaces of said fibers being coated with a polymeric composition; and wherein the first panel and the second panel are adjoined but are not fixed in position relative to each other.

DETAILED DESCRIPTION

Figure 3:
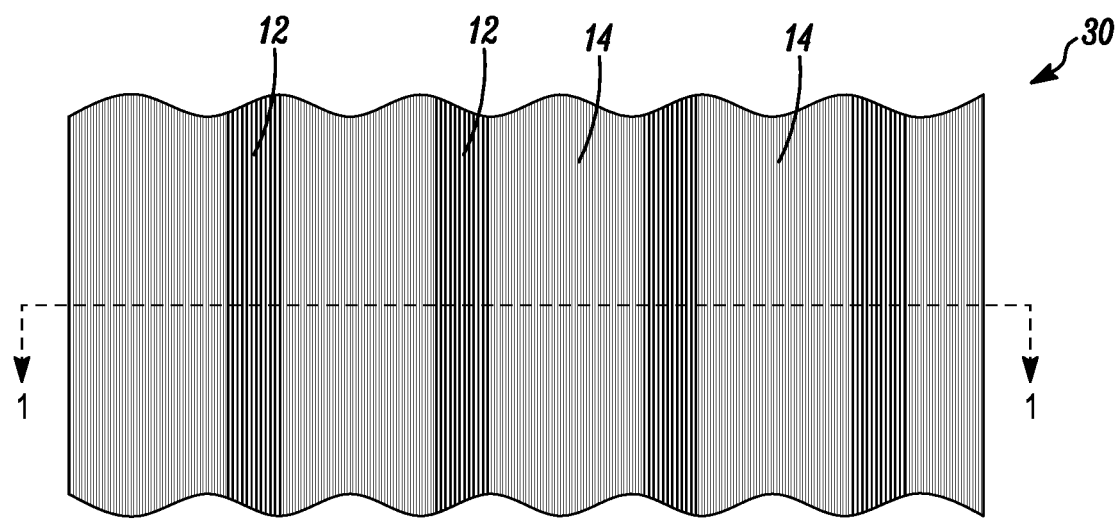
FIG. 3 is a top view schematic representation of a single-ply unidirectional non-woven fabric layer of this disclosure with the fibers being oriented at 0° and having areas of comparatively high areal density and low areal density, wherein the areas of high areal density are four longitudinal sections having higher filament concentration than the low areal density areas, with the filaments protruding from one of the major surfaces of the ply.
Figure 6:
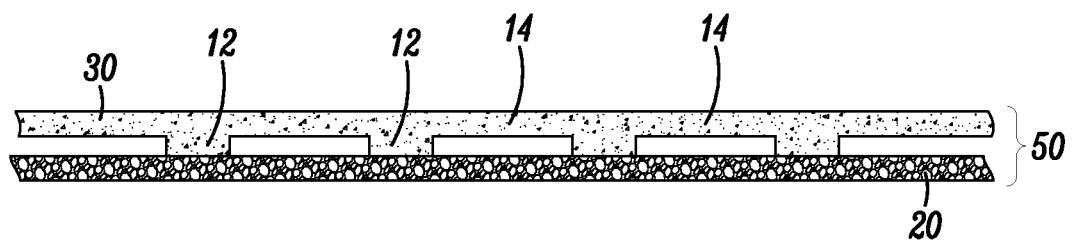
FIG. 6 is a side view schematic representation of a two-ply stab, spike, ballistic resistant panel formed with the non-uniform fabric layer illustrated in FIG. 3 being coupled on one of its major surfaces with the uniform 0°/90° non-woven fabric layer 20 illustrated in FIG. 2 (layer 20 shown as a single layer).
Figure 7:
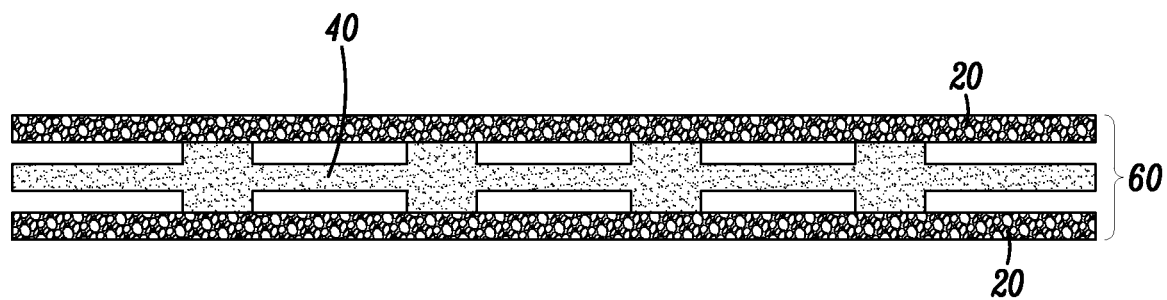
FIG. 7 is a side view schematic representation of a three layer stab, spike, ballistic resistant panel formed with the non-uniform fabric layer illustrated in FIG. 3 being coupled on both of its major surfaces with the uniform 0°/90° non-woven fabric layer 20 as illustrated in FIG. 2 (layers 20 shown as single layers).

The composite articles of this disclosure that have stab, spike and ballistic resistance incorporate at least one stab, spike and ballistic resistant panel that comprises a plurality of non-woven fabric layers that may or may not be attached to each other but that are at least partially separated from each other. At least one of said non-woven fabric layers has a non-uniform areal density such that it has thick areas and thin areas. The thick areas are areas of high filament density relative to the thin areas, which thick areas protrude from at least one surface of the non-uniform fabric layer. Each of these types of areas (or portions) extend axially down the entire length of the fabric as illustrated in FIG. 3, with thick and thin areas alternating transversely across the width of the fabric. As illustrated in FIGS. 6 AND 7, the protruding areas prevent other fabric layers that are coupled with the non-uniform layer from lying flat on the surface of said non-uniform layer, thereby spacing the layers apart and preventing the opposing surfaces of the layers from fully contacting each other. While some portions of the opposing surfaces may contact each other, or are at least capable of contacting each other under certain circumstances (e.g., when subjected to pressure), they will not fully contact each other, i.e., some space will be present between the fabric layers.

In areas where the opposing surfaces are in contact with each other, such is referred to herein as direct coupling. In areas where the opposing surfaces are blocked from contacting each other by areas of protruding filaments, such is referred to herein as indirect coupling. Accordingly, two coupled layers may be both directly coupled and indirectly coupled with each other, or they may be entirely indirectly coupled with each other. Due to the protrusions from the non-uniform fabric layer, these coupled fabric layers of the stab, spike, ballistic resistant panel having protrusions therebetween cannot be entirely directly coupled with each other.

Each of the non-woven fabric layers forming the stab/spike/ballistic resistant panel is formed from one or more non-woven fabric plies, wherein each non-woven fabric ply comprises an array of substantially parallel, uniaxially oriented, unidirectional elongate bodies. Said elongate bodies may be monofilament fibers, multifilament fibers, fibrous tapes or non-fibrous tapes. As used herein, the term "fabric" describes structures that may include one or more plies, with or without molding or consolidation of the plies, which may be fibrous (i.e., comprise fibers or a combination of fibers and tapes (fibrous and/or non-fibrous tapes)), or may be non-fibrous (i.e., being formed from non-fibrous tapes and not including fibers). Accordingly, a "fabric" describes structures that may be formed with either fibers (monofilament, multifilament or a combination thereof), or tapes (fibrous or non-fibrous) or a combination thereof. A "fabric layer" is an arrangement or sheet of material formed from a plurality of fibers/tapes and having both an outer top/front surface and an outer bottom/rear surface. Such a fabric layer may be flat (if of uniform areal density and thickness) or may be shaped into a non-planar form and thus may have a significantly greater width than the fibers/tapes forming it, or may have the same thicknesses and same lengths. As used herein, "fibrous" means that the elongate bodies, as well as the fabric layers and plies formed therefrom, comprise at least some fibers.

Figure 1:
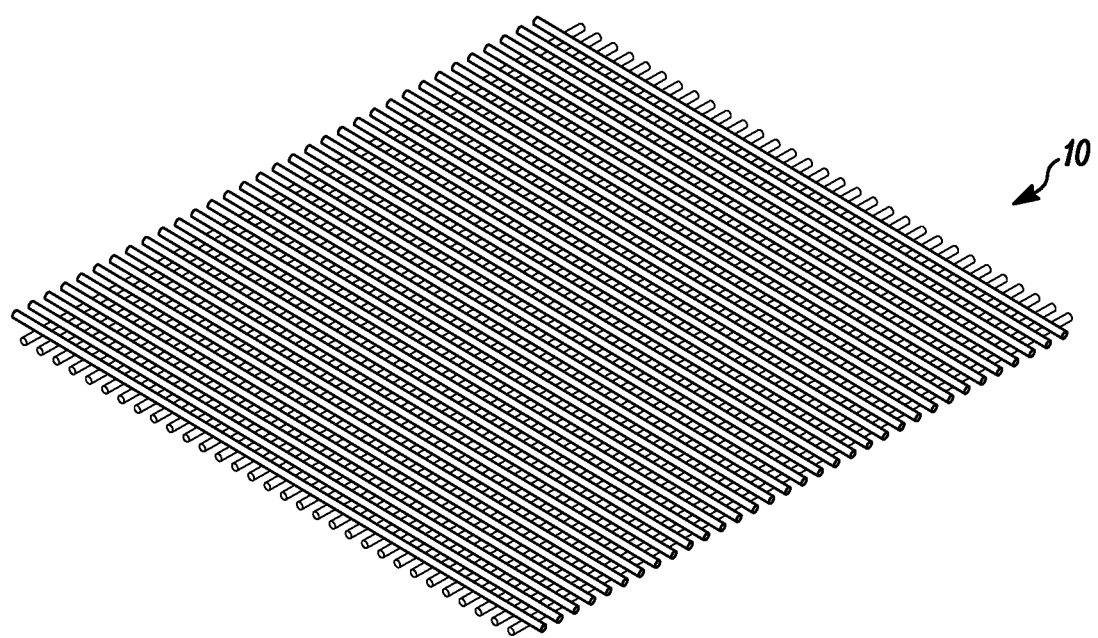
FIG. 1 is a top perspective view schematic representation of a conventional 2-ply, unidirectional non-woven fabric layer of the prior art with monofilament fibers forming each ply, the fibers being oriented at 0°/90° relative to the longitudinal axis of the fabric layer.
Figure 2:
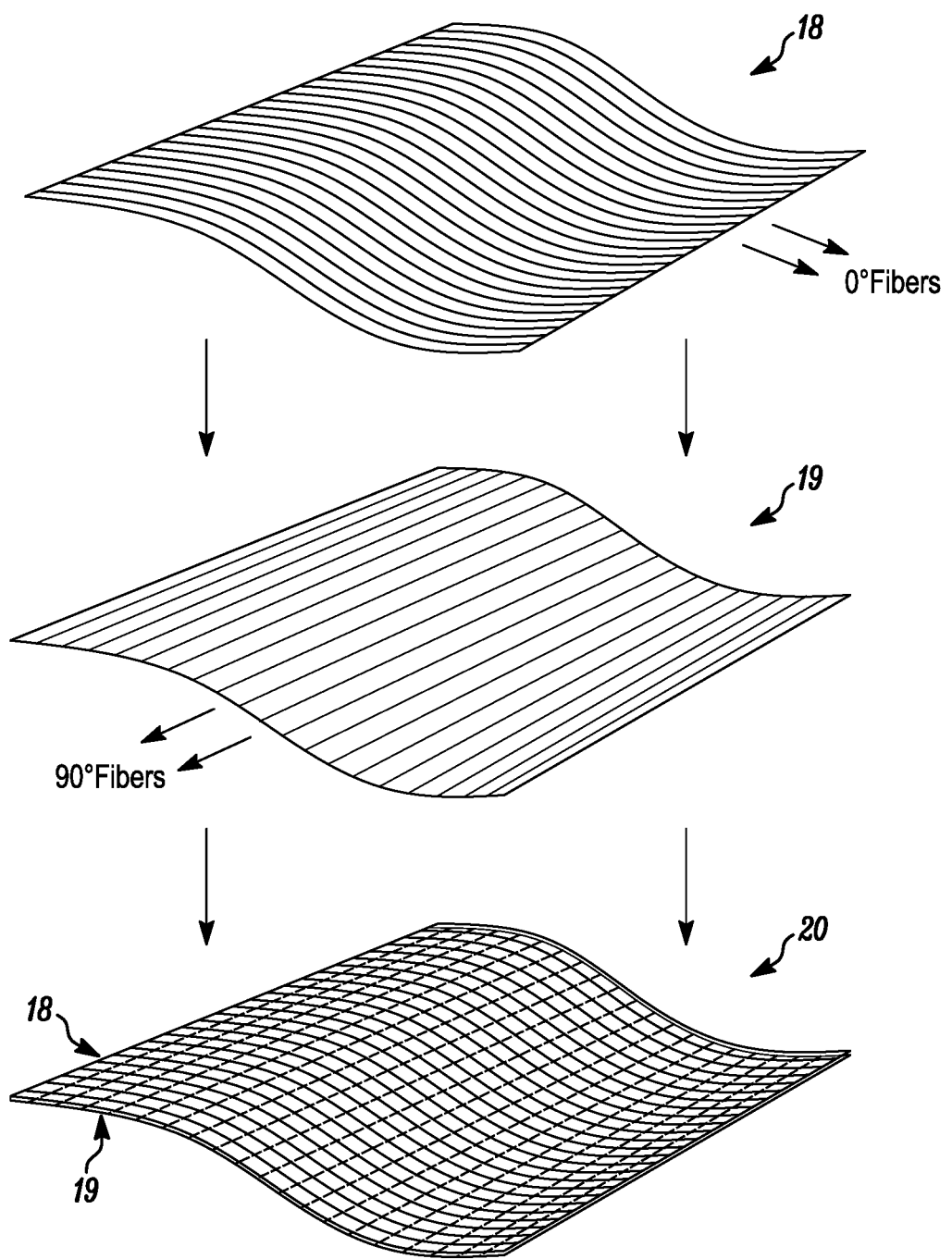
FIG. 2 is a perspective view schematic representation of the formation of a conventional 2-ply, 0°/90° cross-plied unidirectional non-woven fabric layer of the prior art with unidirectional fibers forming each ply, with the fibers of the attached plies being oriented perpendicular to each other.
Figure 4:
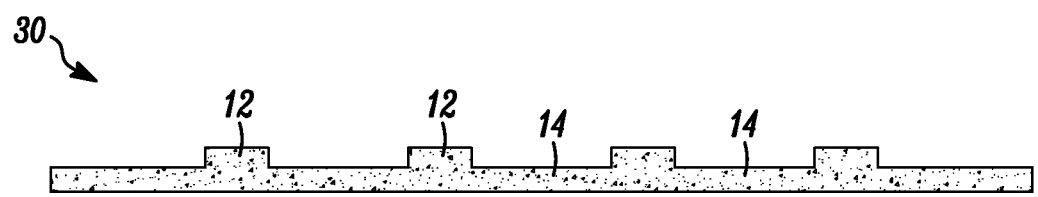
FIG. 4 is a side view schematic representation of the single-ply unidirectional non-woven fabric layer illustrated in FIG. 3 having four longitudinal areas of high areal density, as viewed along line 1.
Figure 5:
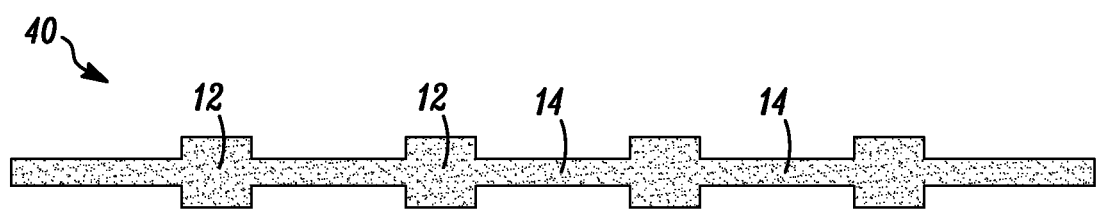
FIG. 5 is a side view schematic representation of a single-ply unidirectional non-woven fabric layer of this disclosure with the fibers being oriented at 0° and having areas of comparatively high areal density and low areal density, wherein the areas of high areal density are four longitudinal sections having higher filament concentration than the low areal density areas, with the filaments protruding from both major surfaces of the fabric.

In the preferred embodiments, each non-woven fabric layer of the stab/spike/ballistic resistant panel that has uniform or substantially uniform areal density comprises two consolidated non-woven fabric plies, wherein the elongate bodies of the two consolidated plies are most preferably oriented in different directions, such as illustrated in FIGS. 1-3. FIG. 1 illustrates a conventional, non-woven, 2-ply fabric layer 10 comprising two unidirectional, cross-plied parallel fiber arrays (monofilament or multifilament) wherein the fibers of the two plies are perpendicular to each other, and wherein the plies are adjoined but not consolidated into a unitary, monolithic layer. FIG. 2 schematically illustrates the formation of a unitary, monolithic 2-ply fabric layer 20 of the prior art comprising two unidirectional non-woven fiber plies (two arrays of fibers), wherein the fibers of the two plies are perpendicular to each other. The fibers forming the first fiber ply 18 are oriented at 0° and the fibers forming the second fiber ply 19 are oriented at 90°, each relative to the longitudinal axis of the fabric layer. Upon consolidation under pressure with a matrix/binder coating, the plies are merged to form the 0°/90° fabric layer 20. FIG. 3 illustrates a single ply, unidirectional non-woven fabric layer 30 of this disclosure comprising monofilament or multifilament fibers, wherein the single ply has a non-uniform areal density. As schematically illustrated, the non-uniform fabric layer has thick areas 12 and thin areas 14, where the thick areas 12 have a greater filament concentration (greater filament density), or greater tape concentration, than the thin areas 14. The thick areas protrude from at least one of the fabric surfaces, thereby at least partially spacing the coupled layers from each other and further enhancing article flexibility. As illustrated in FIG. 4, the thick areas may protrude from only one of the major fabric surfaces to form layer 30 as shown. As illustrated in FIG. 5, the thick areas may protrude from both of the major fabric surfaces to form layer 40 as shown. As illustrated in FIGS. 6 and 7, layers 30 and 40 are then coupled with at least one layer 20, which forms a stab/spike/ballistic resistant panel of this disclosure (50, 60). FIG. 6 illustrates an embodiment where the non-uniform fabric layer 30 is coupled on one of its surfaces with a 0°/90° fabric layer 20 to form a stab/spike/ballistic resistant panel 50, but layer 30 may alternatively be coupled with a single 0° ply 18 or a single 90° ply 19 rather than a 2-ply layer 20. FIG. 7 illustrates an embodiment where the non-uniform fabric layer 40 is coupled on both of its major surfaces with a 0°/90° fabric layers 20 to form a stab/spike/ballistic resistant panel 60. Alternatively, layer 40 may be coupled with a single 0° ply 18 on either or both surfaces, a single 90° ply 19 on either or both surfaces, or a combination thereof rather than 2-ply layers 20.

Figure 8:
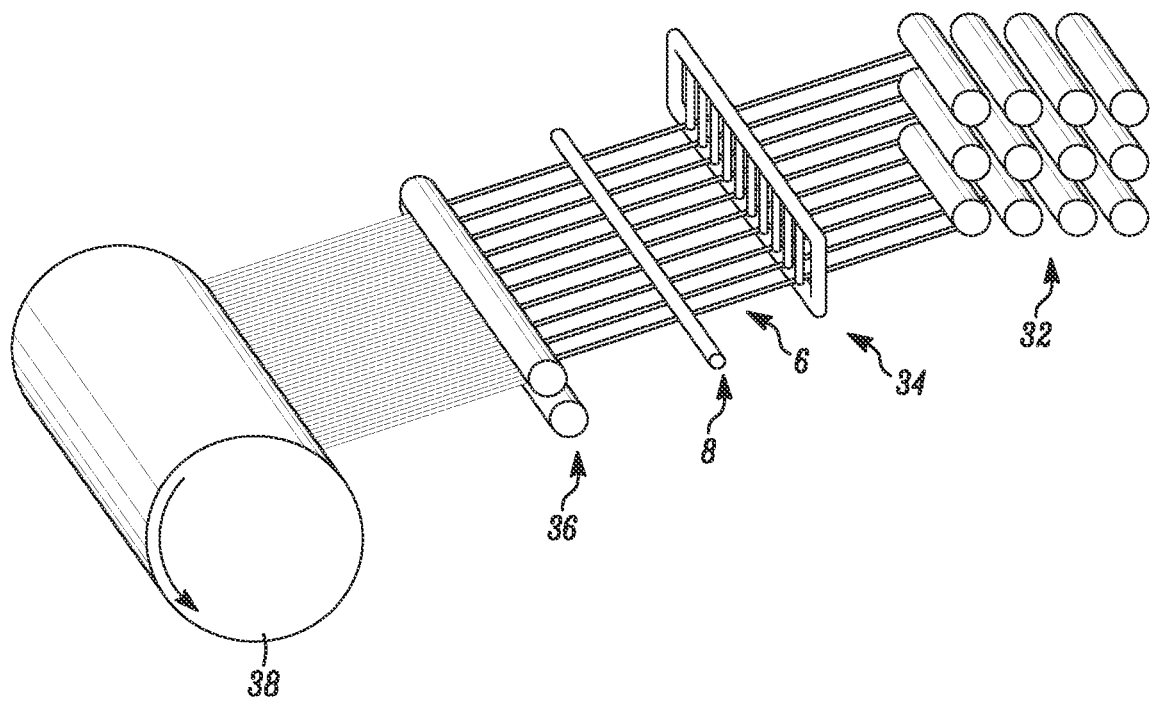
FIG. 8 is a top perspective view schematic representation of the formation of a unidirectional fiber ply of the prior art having uniform areal density.

As shown in FIGS. 3 and 4 when viewed together, the thick areas 12 are most preferably uniform axial ridges that extend along the entire length (i.e., the longitudinal axis) of the non-uniform fabric layer. Non-uniform fabric layers having such axial ridges may be fabricated, for example, by modifying conventional techniques that are used to form non-woven unidirectional fabrics from a plurality of monofilament/multifilament fibers or tapes. As illustrated in FIG. 8, in a conventional method of the prior art for forming unidirectional fiber plies having a uniform areal density, a plurality of fibers are supplied from a creel 32 and arranged into a uniform or substantially uniform parallel array of fibers. Filament bundles 6 are passed through a heddle 34, the filament bundles 6 are typically (but optionally) passed through a binder/resin coater 8 whereby they are coated with a binder/resin that helps hold the filaments together in the bundle form. Thereafter, the coated or uncoated filament bundles 6 are passed through an apparatus 36 that will either flatten the filament bundles 6 into strips having a generally rectangular cross section or reorganize the bundles side-by-side in a coplanar fashion to form a continuous fabric layer. In this regard, shaping apparatus 36 may comprise, for example, a pair of moving rolls, a pair of stationary rolls, a combination of a moving roll and stationary roll, a grooved roll/bar, a combination of a moving/stationary roll and a grooved bar, or another apparatus as would be determined by one skilled in the art to be suitable for their needs. If the shaping apparatus 36 is or includes a grooved roll/bar, the flattened bundles will be held in place within the grooves in the form of strips/tapes. If the shaping apparatus 36 is or includes a pair of moving rolls, a pair of stationary rolls, a combination of a moving roll and stationary roll, without a grooved roll/bar, then the shaping apparatus 36 will spread the filaments apart, pressing the bundles into each other and reorganizing them side-by-side in a coplanar fashion into a continuous fabric layer.

Figure 9:
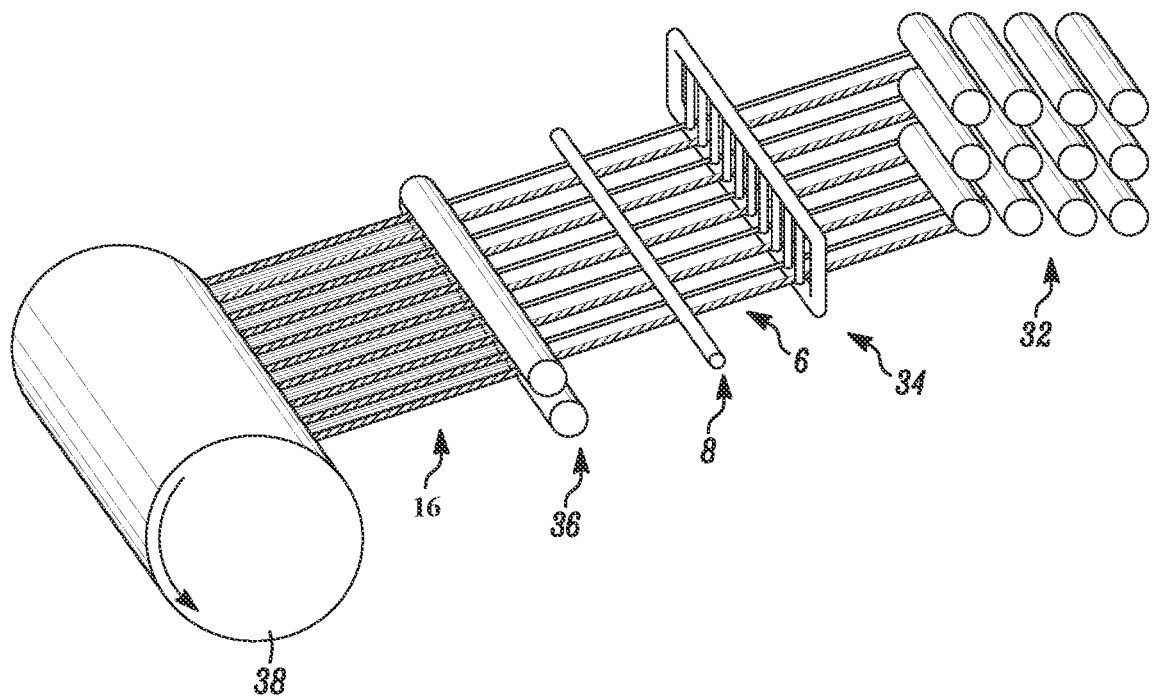
FIG. 9 is a top perspective view schematic representation of the formation of a unidirectional fabric layer having non-uniform areal density, wherein a non-equal number of fiber ends are inserted into each slot of a heddle to create a non-uniform layer.

In the context of the present disclosure, a non-uniform, continuous fabric web/layer having thick areas of comparatively (compared to the thin areas) high filament concentration/density and thin areas of comparatively (compared to the thick areas) low filament concentration/density (as illustrated in either FIG. 4 or FIG. 5) is achieved by increasing the number of filaments or filament bundles inserted into selected slots of heddle 34 as desired. For example, heddle 34 as illustrated in FIG. 8 and FIG. 9 includes ten slots. In the process illustrated in FIG. 8, an equal number of filament bundles (each bundle including an equal or substantially similar number of filaments) are threaded through each of the ten slots of the heddle 34, resulting in substantially equal fiber spreading upon passage of the filament bundles through shaping apparatus 36. In the process illustrated in FIG. 9, every other slot of the heddle 34 is threaded with double the number of filaments, e.g., two filament bundles rather than one (each bundle including, for example, 240 filaments). As a result, a continuous, non-uniform array of filaments 16 is fabricated, said array having thick areas of high filament concentration/density in areas where, for example, 2× filaments (or more) were threaded through the heddle 34, and having comparatively thin areas of comparatively low filament concentration/density in areas where, for example, 1× filaments were threaded through the heddle 34. The continuous array of filaments 16 is optionally rolled onto storage roll 38 for storage until needed for use. Rolling the array 16 onto roll 38 may cause one surface of the array 16 to flatten whereby the filaments will protrude from only a single major surface of the array, thereby forming a layer 30 as illustrated in FIG. 4 when the array is trimmed to the desired dimensions. Alternatively, the continuous array may be immediately trimmed to the desired dimensions or laid out in sheet form to maintain protrusions from both surfaces as illustrated in FIG. 5. In another embodiment, protrusions from both surfaces may be maintained by coating the filaments of the continuous array with a polymer/resin (e.g., from 1% by weight to about 25% by weight of the coated array, preferably from 2% to about 16% by weight) using any polymer/resin disclosed herein), and allowing the polymer/resin to dry and solidify (and stiffen), after which the array may optionally be rolled onto a storage roll 38 and neither surface will flatten.

The illustrations of FIGS. 8 and 9 are not drawn to scale and known heddles generally may be customized to include any number of slots, with any slot dimensions as desired, allowing the filaments to be spread quite thin and have any desired width. In this regard, the thick and thin areas of the array/fiber layers may be customized to have any desired density as desired by modifying the number of filament bundles threaded through the heddle. In one preferred embodiment, the thick areas have an areal density of at least two times the areal density of the thin areas, whereby the thick areas, as noted above, have two times (2×) the filaments threaded through the heddle compared to the thin areas which would have 1× filaments threaded through the heddle (i.e., one half of the filaments compared to the filaments of the thick areas, with all filaments in each area having the same denier). In another embodiment, the thick areas have an areal density of at least three times the areal density of the thin areas, whereby the thick areas have three times (3×) the filaments threaded through the heddle compared to the thin areas which would have 1× filaments threaded through the heddle in the thin areas (i.e., one third of the filaments compared to the filaments of the thick areas, with all filaments in each area having the same denier). Thicker and thinner areas are also appropriate. For example, the thick areas may have 4 times (4×), 5 times (5×), six times (6×), seven times (7×), eight times (8×), nine times (9×), ten times (10×) or more than 10 times the filaments compared to the thin areas. The depth of the protrusions formed at the areas of greater thickness will likewise vary and be relative to the number of filaments in the thinner areas. As noted below, a typical two-ply unidirectional non-woven fabric will have a preferred thickness of from about 12 μm to about 600 μm, more preferably from about 50 μm to about 385 μm and most preferably from about 75 μm to about 255 μm. Thus, a typical single-ply unidirectional non-woven fabric will have a preferred thickness of from about 6 μm to about 300 μm, more preferably from about 25 μm to about 192.5 μm and most preferably from about 37.5 μm to about 127.5 μm. For example, in a composite where the thick areas have 2× filament density and the protrusions extend from only one surface, the height/depth of the protrusions would preferably be 100 μm if the thickness of the thin areas is 50 μm, and if protrusions extended from both surfaces, the height/depth of the protrusions would be 1.5× the layer thickness, i.e., 75 μm. The actual layer thicknesses may vary but the thickness ratio of thick to thin areas should be at least 1.5:1, preferably 2:1, more preferably 3:1. Most preferably ranging from 1.5:1 to about 4:1, or more preferably from about 1.5:1 to about 3:1. However, the ratios and spacing distances between coupled fabric layers may vary, with coupled plies preferably being separated at their nearest facing separated surfaces by about 1 mil (0.025 mm) to about 20 mil (0.5 mm), more preferably 5 mil (0.125 mm) to about 10 mil (0.25 mm)

The thick areas will exist as axial ridges extending along the entire length of the non-uniform fabric layer, and thus in most embodiments, along the entire length of the non-woven, stab/spike/ballistic resistant panels of this disclosure. As an alternative, the non-uniform fabric layer may be patterned so that a portion of an axial protrusion extends along a first surface of the fabric layer (e.g., the top surface) while another portion of said axial protrusion extends from a second surface of the fabric layer (e.g., the bottom surface).

In either embodiment, the axial ridges are laterally spaced apart from each other across the width of the non-uniform fabric layer (and the non-woven, stab/spike/ballistic resistant panel) as illustrated in FIGS. 3-7. Preferably, the ridges are spaced apart at their nearest longitudinal edges by at least about 1/16 inch (0.15875 cm), preferably from about 1/16 inch up to about 1 inch (2.54 cm) or any range in between those points. More preferably, tapes are separated from each other at their nearest longitudinal edges by about 1/16 inch up to about 1 inch (2.54 cm), still more preferably from about 1/16 inch up to about 1/2 inch (1.27 cm), still more preferably from about 1/16 inch up to about 1/4 inch (0.635 cm), and still more preferably from about 1/16 inch up to about 1/8 inch (0.3175 cm). These distances are regulated by the spacing apart of the filament bundle ends in the heddle, wherein the closest positioning is illustrated in FIG. 9 whereby 1× and greater than 1× bundles are alternated. The spacing may be extended by separating the greater than 1× bundle slots further apart from each other. For example, by inserting 2×, 3×, etc., fiber bundles in every third, fourth, fifth, etc., heddle slot as may be desired.

In the preferred embodiments of this disclosure, larger spacing distances of the dense areas/axial ridges are most preferred. In this regard, it is preferred that the lateral spacing between all dense areas/axial ridges is at least about 1.0 cm, preferably greater than 1.0 cm, more preferably >1.5 cm, or >2.0 cm, or >2.5 cm, or >3.0 cm, or >3.5 cm, or >4.0 cm, or any of these spacing distances up to about 5 inches (12.7 cm). It should also be understood that all ranges presented this application are interpreted to include all values in between the recited minimum and maximum values as potential range endpoints.

As illustrated in FIGS. 6 and 7, which are partial views of fabrics that may have any dimensions in length and width as desired, at least one conventional first fabric layer 20 having fibers oriented at 0°/90° or oriented at other cross-plied orientations, e.g., ±45°, is coupled with at least one non-uniform fabric layer wherein the protruding areas of high areal density serve as spacers between the fabric layer surfaces. With particular regard to FIG. 6, a single 0°/90° oriented non-woven fabric layer 20 as illustrated in FIG. 2 is coupled with one major surface (front or rear surface) of a non-uniform fabric layer 30 as illustrated in FIG. 4 to thereby form a 3-ply composite layer 50 wherein the axial protrusions are positioned in contact with the surface of fabric layer 20. With particular regard to FIG. 7, two 0°/90° oriented non-woven fabric layers 20 as illustrated in FIG. 2 are coupled with both major surfaces (front and rear surfaces) of a non-uniform fabric layer 40 as illustrated in FIG. 5 to thereby form a 5-ply composite layer 60, wherein the axial protrusions are positioned in contact with the surfaces of fabric layers 20. In each of these embodiments, the fabric layers are adjoined using conventional techniques (e.g., either manually or using conventional equipment) to form coupled fabric layers/plies wherein the protrusions create a separation between the coupled fabric layers such that the fabric layers are at least partially spaced apart from each other. In this regard, "at least partially" spacing apart the fabric layers means that all of the inner surfaces of two coupled fabric layers are completely separated and not in contact with each other, or they may be partially separated from each other and partially in contact with each other. If partially contacting each other, they may be in full contact with each other except for in areas where the protrusions are located, or they may be separated in the areas adjacent to the protrusions. Complete or full spacing will generally depend on the width of the gap (separation distance) between protrusions and the flexibility of the fabric layers. The adjoined fabric layers as noted herein may then be connected to each other by stitching together, such as by tack stitching, or by tack bonding the adjoined fabric layers together. Such methods are well known in the art. Tack stitching is a method of localized (partial) attachment of zones or portions of the combined layers, where the layers are stitched together at only a few spots, such as only around the corners of the combined layers or only along the edges or along part of the edges, such as a center portion of each edge, or in each of said locations (edges and corners), often with a loose stitch. Tack bonding also is a method of localized attachment of zones, portions or spots of the combined layers, rather than bonding the layers together along the entire area of their contacting surface, often being accomplished with relative low pressure. For example, the combined layers may be spot bonded together at several spots along the combined layers, or may be pressed at the edges and/or corners, such as with a heated metal frame, with or without the application of an intermediate adhesive between the layers (with useful adhesives non-exclusively including any of the binders or resins already described herein, as well as others such as hot melt adhesives). Both tack stitching and tack bonding are accomplished with conventionally known equipment such as stitching machines or textiles bonders commercially available from, for example, Sonobond Ultrasonics of West Chester, Pa.

Alternatively, the layers may be adjoined together without attachment to each other, such as by being held together in a pouch or polymeric envelope as described herein.

In each of the above embodiments, the layers 30/40 are preferably in contact with but not attached to the surface(s) of fabric layer(s) 20. Alternatively, the coupled layers may be attached to each other by lamination with heat and/or pressure or by tack bonding/stitching, according to conditions that are conventional in the art. In further alternative embodiments, the coupled layers may be non-adhesively attached to each other by methods such as by sewing, stitching, bolting, riveting, etc., which are conventionally known methods in the art for attaching fabric layers together.

A combination of non-woven fabric layer having a non-uniform areal density and at least one conventional non-woven fabric layer of uniform areal density, wherein the facing surfaces of the two fabric layers are separated by the protrusions 12 is referred to herein as a non-woven, stab, spike and ballistic resistant panel. A stab, spike and ballistic resistant panel may also be formed from two adjoined non-woven, unidirectional layers where both have non-uniform areal density. Consistent with this disclosure, the non-woven, stab/spike/ballistic resistant panel may further include additional fabric layers, either wherein each pair of fabric layers (i.e., each coupled/adjoined group of two fabric layers) includes at least one non-uniform fabric layer and are thus spaced apart by intermediate protrusions from the non-uniform fabric layer, or wherein only one or more of the layers in an adjoined stack of layers is a non-uniform fabric layer. Preferably, each alternating layer in a stack of non-woven fabric layers will have a non-uniform areal density to maximize flexibility and to maximize stab and spike resistance of the stab/spike/ballistic resistant panel.

As discussed herein, each of the fabric layers of this disclosure may be formed either from a plurality of fibers, a plurality of fibrous tapes or a plurality of non-fibrous tapes. Anything that is described herein as "fibrous" is formed from fibers, whereas non-fibrous means that the components are not formed from fibers. In the most preferred embodiments of the disclosure, all the non-woven fabric layers forming the stab/spike/ballistic resistant panel are fibrous layers. As used herein, a "fiber" is a long strand of a material, such as a strand of a polymeric material, the length dimension of which is much greater than the transverse dimensions of width and thickness. The fiber is preferably a long, continuous (but of a definite length) strand, rather than a short segment of a strand referred to in the art as a "staple" or "staple fiber." A "strand" by its ordinary definition is a single, thin length of something, such as a thread or fiber. The cross-sections of fibers for use herein may vary widely, and they may be circular, flat or oblong in cross-section. They also may be of irregular or regular multi-lobal cross-section having one or more regular or irregular lobes projecting from the linear or longitudinal axis of the filament. Thus the term "fiber" includes filaments, ribbons, strips and the like having regular or irregular cross-section. It is preferred that the fibers have a substantially circular cross-section.

A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. Multifilament fibers as defined herein preferably include from 2 to about 3000 filaments, more preferably from 2 to 1000 filaments, still more preferably from 30 to 500 filaments, still more preferably from 40 to 500 filaments, still more preferably from about 40 filaments to about 240 filaments and most preferably from about 120 to about 240 filaments. Multifilament fibers are also often referred to in the art as fiber bundles or a bundle of filaments. As used herein, the term "yarn" is defined as a single strand consisting of multiple filaments and is used interchangeably with "multifilament fiber."

The term "denier" is a unit of linear density equal to the mass in grams per 9000 meters of fiber/yarn or tape. In this regard, the fibers forming a fibrous fabric layer may be of any suitable denier. For example, fibers may have a denier of from about 50 to about 5000 denier, more preferably from about 200 to about 5000 denier, still more preferably from about 200 to about 3000 denier, still more preferably from about 200 to about 1000 denier, and most preferably from about 200 to about 500 denier. Like fibers, fibrous tapes may be fabricated from the exact same polymer types discussed above for fibers, because such tapes are formed by compressing and flattening such fibers. Accordingly, like fibers, the tapes may be of any suitable denier, preferably having a denier of from about 50 to about 30,000, more preferably from about 200 to about 10,000 denier, still more preferably from about 650 to about 2000 denier, and most preferably from about 800 to about 1500 denier.

Except for the non-uniform fabric layers, each non-woven fabric layer may comprise a single-ply of unidirectionally oriented (uniaxial) fibers or tapes, a plurality of interconnected (e.g., stitched (e.g., tack stitched), sewn, adhered, tack bonded) but non-consolidated plies (i.e., not merged into a single, unitary element) of unidirectionally oriented fibers or tapes, or a plurality of consolidated plies of unidirectionally oriented fibers or tapes. A "layer" describes a generally planar, sheet-like arrangement that can be shaped into a non-planar form. A "ply" or "single-ply" of unidirectionally oriented fibers/tapes comprises an arrangement of substantially non-overlapping fibers or tapes that are aligned in a unidirectional (uniaxial), substantially parallel array. This type of fiber/tape arrangement is also known in the art as a "unitape", "unidirectional tape", "UD" or "UDT." Each fabric layer and each individual ply has both an outer top/front surface and an outer bottom/rear surface. As used herein, an "array" describes an orderly side-by-side, coplanar parallel arrangement of fibers or tapes, which is exclusive of woven fabrics, and a "parallel array" describes an orderly parallel arrangement of fibers/tapes. The term "oriented" as used in the context of "oriented fibers" or "oriented tapes" refers to the alignment of the fibers/tapes rather than to stretching of the fibers/tapes. Each non-uniform fabric layer includes only a single ply of parallel fibers (monofilament fibers or multifilament bundles), parallel tapes, or a combination of fibers and tapes.

Any fabric layer of this disclosure (having uniform areal density or non-uniform areal density) will have a width of at least 10 inches (25.4 cm), more preferably a width of at least about 12 inches (30.48 cm), still more preferably a width of at least about 15 inches (38.1 cm), still more preferably a width of at least about 18 inches (45.72 cm), still more preferably a width of at least about 20 inches (50.8 cm), still more preferably a width of at least about 24 inches (60.96 cm), and most preferably a width of at least about 30 inches (76.2 cm).

With regard to the conventional non-woven fabric layers useful herein, i.e., those having a uniform or substantially uniform areal density, when such layers are formed from unidirectional fibers they typically comprise a plurality of fabric plies that are stacked on each other surface-to-surface in a substantially coextensive fashion and consolidated. When used herein, a "single-layer" structure refers to any monolithic fabric/composite structure composed of one or more individual plies/individual layers that have been merged, i.e. consolidated by low pressure lamination or by high pressure molding, into a single unitary structure, optionally together with a polymeric binder material. By "consolidating" it is meant that the optional polymeric binder material together with each fabric ply/fabric layer are combined and merged into a single unitary layer. Consolidation can occur via drying, cooling, heating, pressure or a combination thereof. Heat and/or pressure may not be necessary, as the fibers or fabric plies/layers may just be glued together, as is the case in a wet lamination process. The term "composite" refers to combinations of fibers or tapes, typically with at least one polymeric binder material, and also includes combinations of multiple fibrous layers and/or multiple panels. As described herein, all "non-woven" materials (i.e., non-woven plies, layers, fabrics) refer to any fabric structures that are not formed by weaving. For example, non-woven fabrics may comprise a plurality of unitapes that are at least partially coated with a polymeric binder material, stacked/overlapped and consolidated into a single-layer, monolithic element, as well as a felt or mat comprising non-parallel, randomly oriented fibers that are preferably coated with a polymeric binder composition.

Each non-woven fabric ply/layer disclosed herein comprises a plurality of high tensile strength (i.e., high tenacity), high tensile modulus polymeric fibers and/or non-fibrous high tensile strength, high tensile modulus polymeric tapes. As used herein, a "high tensile strength, high tensile modulus" fiber or tape is one which has a preferred tenacity of at least about 7 g/denier or more, a preferred tensile modulus of at least about 150 g/denier or more, and preferably an energy-to-break of at least about 8 J/g or more, each as measured by ASTM D2256 for fibers and ASTM D882 (or another suitable method as determined by one skilled in the art) for polymeric tapes. The high tensile strength fibers preferably have a tenacity of greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier. Useful tapes are preferably "high tensile strength" tapes having a tenacity of at least about 10 g/denier, an initial tensile modulus of at least about 150 g/denier or more, and an energy-to-break of at least about 8 J/g or more, each as measured by ASTM D882-09 at 10 inch (25.4 cm) gauge length and at an extension rate of 100%/min. The high tensile strength tapes preferably have a tenacity of greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier, each as measured by ASTM D882-09 at 10 inch (25.4 cm) gauge length and at an extension rate of 100%/min. Regarding these properties, as used herein, the term "tenacity" refers to the tensile stress expressed as force (grams) per unit linear density (denier) of an unstressed specimen. The "initial modulus" of a fiber or tape is the property of a material representative of its resistance to deformation. The term "tensile modulus" refers to the ratio of the change in tenacity, expressed in grams-force per denier (g/d) to the change in strain, expressed as a fraction of the original fiber or tape length (in/in).

In embodiments where the fabric layers comprise fiber-based materials, particularly suitable high tenacity fibers include polyolefin fibers, such as high molecular weight polyethylene fibers, particularly ultra-high molecular weight polyethylene fibers, and polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzoxazole (PBO) fibers, polybenzothiazole (PBT) fibers, liquid crystal copolyester fibers, rigid rod fibers such as M5® fibers, and glass fibers, including electric grade fiberglass (E-glass; low alkali borosilicate glass with good electrical properties), structural grade fiberglass (S-glass; a high strength magnesia-alumina-silicate) and resistance grade fiberglass (R-glass; a high strength alumino silicate glass without magnesium oxide or calcium oxide). Each of these fiber types is conventionally known in the art. Also suitable for producing polymeric fibers are copolymers, block polymers and blends of the above materials.

The most preferred fiber types are high performance fibers including polyethylene fibers (particularly extended chain polyethylene fibers), aramid fibers, PBO fibers, liquid crystal copolyester fibers, polypropylene fibers (particularly highly oriented extended chain polypropylene fibers), polyvinyl alcohol fibers, polyacrylonitrile fibers, glass fibers and rigid rod fibers, particularly M5® rigid rod fibers. Specifically most preferred are polyethylene fibers and aramid fibers.

In the case of polyethylene, preferred fibers are extended chain polyethylenes having molecular weights of at least 300,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975;

6,969,553; 7,078,099; 7,344,668 and U.S. patent application publication 2007/0231572, all of which are incorporated herein by reference.

Particularly preferred fiber types are any of the polyethylene fibers sold under the trademark SPECTRA® from Honeywell International Inc. of Morris Plains, N.J. SPECTRA® fibers are well known in the art.

Particularly preferred methods for forming UHMW PE fibers are processes that are capable of producing UHMW PE fibers having tenacities of at least 39 g/denier, most preferably where the fibers are multi-filament fibers. The most preferred processes include those described in commonly-owned U.S. Pat. Nos. 7,846,363; 8,361,366; 8,444,898; 8,747,715; as well as U.S. publication no. 2011-0269359, the disclosures of which are incorporated by reference herein to the extent consistent herewith. Such processes are called "gel spinning" processes, also referred to as "solution spinning," wherein a solution of ultra high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either fibers or yarns. The fibers/yarns are then stretched (drawn) up to a maximum drawing capacity to increase their tenacity.

Preferred aramid (aromatic polyamide) fibers are well known and commercially available, and are described, for example, in U.S. Pat. No. 3,671,542. For example, useful aramid filaments are produced commercially by DuPont under the trademark of KEVLAR®. Also useful herein are poly(m-phenylene isophthalamide) fibers produced commercially by DuPont of Wilmington, Del. under the trademark NOMEX® and fibers produced commercially by Teijin Aramid Gmbh of Germany under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

Suitable PBO fibers are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers are commercially available and are disclosed, for example, in U.S. Pat. Nos. 3,975,487; 4,118,372 and 4,161,470, each of which is incorporated herein by reference, and including VECTRAN® liquid crystal copolyester fibers commercially available from Kuraray Co., Ltd. of Tokyo, Japan. Suitable polypropylene fibers include highly oriented extended chain polypropylene (ECPP) fibers as described in U.S. Pat. No. 4,413,110, which is incorporated herein by reference. Suitable polyvinyl alcohol (PV—OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available. M5® fibers are formed from pyridobisimidazole-2,6-diyl (2,5-dihydroxy-p-phenylene) and were most recently manufactured by Magellan Systems International of Richmond, Va. and are described, for example, in U.S. Pat. Nos. 5,674,969, 5,939,553, 5,945,537, and 6,040,478, each of which is incorporated herein by reference. The term "rigid rod" fibers is not limited to such pyridobisimidazole-based fiber types, and many PBO and aramid fiber varieties are often referred to as rigid rod fibers. Commercially available glass fibers include S2-Glass® S-glass fibers commercially available from AGY of Aiken, S.C., HiPerTex™ E-Glass fibers, commercially available from 3B Fibreglass of Battice, Belgium, and VETROTEX® R-glass fibers from Saint-Gobain of Courbevoie, France.

As noted above, the fabric layers of the disclosure may be fabricated from tapes rather than fibers. As used herein, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. Known tapes may be fibrous or non-fibrous, wherein a "fibrous" tape comprises one or more filaments. The cross-section of a tape of this disclosure may be rectangular, oval, polygonal, irregular, or of any shape satisfying the width, thickness and aspect ratio requirements outlined herein.

Such tapes preferably have a substantially rectangular cross-section with a thickness of about 0.5 mm or less, more preferably about 0.25 mm or less, still more preferably about 0.1 mm or less and still more preferably about 0.05 mm or less. In the most preferred embodiments, the polymeric tapes have a thickness of up to about 3 mils (76.2 µm), more preferably from about 0.35 mil (8.89 µm) to about 3 mils (76.2 µm), and most preferably from about 0.35 mil to about 1.5 mils (38.1 µm). Thickness is measured at the thickest region of the cross-section.

Tapes useful herein have preferred widths of from about 2.5 mm to about 50 mm, more preferably from about 5 mm to about 25.4 mm, even more preferably from about 5 mm to about 20 mm, and most preferably from about 5 mm to about 10 mm. These dimensions may vary but the tapes used herein are most preferably fabricated to have dimensions that achieve an average cross-sectional aspect ratio, i.e. the ratio of the greatest to the smallest dimension of cross-sections averaged over the length of the tape article, of greater than about 3:1, more preferably at least about 5:1, still more preferably at least about 10:1, still more preferably at least about 20:1, still more preferably at least about 50:1, still more preferably at least about 100:1, still more preferably at least about 250:1 and most preferred tapes have an average cross-sectional aspect ratio of at least about 400:1. When forming a fabric layer from tapes, a plurality of tapes are arranged side-by-side, substantially coextensively in coplanar fashion to form a wide layer having preferred dimensions as described above.

Tapes are formed by conventionally known methods. For example, a fabric may be cut or slit into tapes having a desired length. An example of a slitting apparatus is disclosed in U.S. Pat. No. 6,098,510 which teaches an apparatus for slitting a sheet material web as it is wound onto said roll. Another example of a slitting apparatus is disclosed in U.S. Pat. No. 6,148,871, which teaches an apparatus for slitting a sheet of a polymeric film into a plurality of film strips with a plurality of blades. The disclosures of both U.S. Pat. Nos. 6,098,510 and 6,148,871 are incorporated herein by reference to the extent consistent herewith. Such methods are particularly useful for forming non-fibrous polymeric tapes but the method of fabricating non-fibrous, polymeric tapes is not intended to be limiting.

Particularly useful methods for forming multi-filament fibrous tapes are described in commonly-owned U.S. Pat. Nos. 8,236,119; 8,697,220; 8,685,519; 8,852,714; 8,906,485, each of which is incorporated herein by reference to the extent consistent herewith. Each of these patents describes methods where a multifilament feed fiber/yarn is compressed and flattened to form a tape. Particularly, U.S. Pat. No. 8,236,119 teaches a process for the production of a polyethylene tape article comprising: (a) selecting at least one polyethylene multi-filament yarn, said yarn having a c-axis orientation function at least 0.96, an intrinsic viscosity when measured in decalin at 135° C. by ASTM D1601-99 of from about 7 dl/g to about 40 dl/g, and said yarn having a tenacity of from about 15 g/d to about 100 g/d as measured by ASTM D2256-02 at a 10 inch (25.4 cm) gauge length and at an extension rate of 100%/min; (b) placing said yarn under a longitudinal tensile force and subjecting said yarn to at least one transverse compression step to flatten, consolidate and compress said yarn at a temperature of from about 25° C. to about 137° C., thereby forming a tape article having an average cross-sectional aspect ratio at least about 10:1, each said compression step having an outset and a conclusion wherein the magnitude of said longitudinal tensile force on each said yarn or tape article at the outset of each said compression step is substantially equal to the magnitude of the longitudinal tensile force on the yarn or tape article at the conclusion of that same compression step, and is at least about 0.25 kilogram-force (2.45 Newtons); (c) stretching said tape article at least once at a temperature in the range of from about 130° C. to about 160° C. at a stretch rate of from about 0.001 $min^{-1}$ to about 1 $min^{-1}$; (d) optionally repeating step (b) one or more times at a temperature from about 100° C. to about 160° C.; (e) optionally repeating step (c) one or more times; (f) optionally relaxing the longitudinal tensile force between any of steps (b) to (e); (g) optionally increasing the longitudinal tensile force between any of steps b) to (e); and (h) cooling said tape article to a temperature less than about 70° C. under tension. This process may also be modified by, prior to step (b), optionally continuously passing the yarn through one or more heated zones at temperatures of from about 100° C. to about 160° C. under tension, followed by stretching the heated yarn at least once at a stretch rate of from about 0.01 $min^{-1}$ to about 5 $min^{-1}$. The compressed and flattened multi-filament tapes formed according to the methods of these commonly-owned patents are particularly desirable herein.

Particularly suitable high-strength, high tensile modulus non-fibrous polymeric tape materials are polyolefin tapes. Preferred polyolefin tapes include polyethylene tapes, such as those commercially available under the trademark TENSYLON®, which is commercially available from E. I. du Pont de Nemours and Company of Wilmington, Del. See, for example, U.S. Pat. Nos. 5,091,133; 7,964,266; 7,964,267; and 7,976,930, all of which are incorporated herein by reference. Also suitable are polypropylene tapes, such as those commercially available under the trademark TEGRIS® from Milliken & Company of Spartanburg, S.C. See, for example, U.S. Pat. No. 7,300,691 which is incorporated herein by reference. Polyolefin tape-based composites that are useful as spall resistant substrates herein are also commercially available, for example under the trademark DYNEEMA® BT10 from Royal DSM N.V. Corporation of Heerlen, The Netherlands and under the trademark ENDUMAX® from Teijin Aramid Gmbh of Germany. Also useful are the fibrous and non-fibrous tapes described in commonly-owned U.S. patents publications U.S. Pat. Nos. 8,986,810; 9,138,961 and 9,291,440, each of which is incorporated herein by reference to the extent consistent herewith. Non-fibrous, polymeric tapes useful herein will have the same preferred thicknesses and aspect ratios as the fiber-based tapes, but may be fabricated to have wider widths of from about 2.5 mm to about 21 cm, more preferably from about 2.5 mm to about 10 cm, still more preferably from about 2.5 mm to 5 cm, still more preferably from about 2.5 mm to about 25 mm, even more preferably from about 5 mm to about 20 mm, and most preferably from about 5 mm to about 10 mm.

Like fibers, multi-filament tapes may be fabricated from the exact same polymer types discussed above for fibers, because such tapes are formed by compressing and flattening such fibers. Accordingly, like fibers, the tapes may be of any suitable denier, preferably having a denier of from about 50 to about 30,000, more preferably from about 200 to about 10,000 denier, still more preferably from about 650 to about 2000 denier, and most preferably from about 800 to about 1500 denier. Additionally, useful tapes are preferably "high tensile strength" tapes having a tenacity of at least 10 g/denier, an initial tensile modulus of at least about 150 g/denier or more, and an energy-to-break of at least about 8 J/g or more, each as measured by ASTM D882-09 at 10 inch (25.4 cm) gauge length and at an extension rate of 100%/min. The high tensile strength tapes preferably have a tenacity of greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier, each as measured by ASTM D882-09 at 10 inch (25.4 cm) gauge length and at an extension rate of 100%/min.

Traditional non-woven unidirectional fabric constructions that have uniform or substantially uniform areal density, whether formed from fibers or tapes, are conventional in the art and methods of their fabrication are also conventional. An exemplary process is illustrated in FIG. 8 wherein a plurality of fibers (or tapes) are arranged into an array, typically being arranged as a fiber/tape web comprising a plurality of fibers/tapes aligned in a substantially parallel, unidirectional array. The apparatus illustrated in FIG. 8 is only exemplary and in a preferred process fiber/tape bundles are supplied from a creel and led through guides and one or more spreader bars into a collimating comb. When fibers are used, this is typically followed by coating the fibers with a polymeric binder material. A polymeric binder coating may also be applied to tapes, but the binder may not be necessary particularly if the tapes comprise fused/bonded filaments, as described in U.S. Pat. No. 8,236,119 or if a binder is already present from their fabrication. The spreader bars and collimating comb disperse and spread out the (non-tape) bundled filaments, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other.

As noted above, each of the traditional uniform/substantially uniform non-woven fabric layers incorporated within the stab/spike/ballistic resistant panel most preferably comprises a plurality of fabric plies that are consolidated, i.e., merged together, to form a single, unitary fabric layer. The plurality of fabric plies are merged together according to conventional methods in the art to form each individual fabric layer prior to coupling pairs of fabric layers. In this regard, a plurality of single plies of the selected fabric ply type are stacked on top of each other in coextensive fashion and consolidated, together.

Conventional non-woven fabric layers include from about 1 to about 100 fabric plies, more typically from 2 to about 50 fabric plies, and most typically from 2 to about 20 fabric plies. When a fabric layer comprises more than 4 fabric plies, it is typical to first form a plurality of 2-ply or 4-ply unidirectional non-woven fiber "pre-pregs" or "pre-preg layers," prior to combining a plurality of such "pre-pregs" or "pre-preg layers" together to form the fabric layer. Typically the fabric plies in these pre-pregs are cross-plied at an angle relative to each other, typically 0°/90°, and wherein each pre-preg is preferably cross-plied relative to other pre-pregs at alternating 0°/90° orientations. However, any other cross-ply angle is also acceptable. The plies forming each fabric layer, including the pre-pregs, are typically merged together with a polymeric binder. In the preferred embodiments of this disclosure, each uniform/substantially uniform fabric layer component of the stab/spike/ballistic resistant panels preferably include only 2 fabric plies to maximize flexibility of the stab/spike/ballistic resistant panels.

At least partially coating the fibers/tapes forming each fabric layer of this disclosure (including the non-uniform fabric layers) with a polymeric binder material (also commonly referred to in the art as a polymeric "matrix" material) is optional, it is preferred. The terms "polymeric binder material" and "polymeric matrix material" are conventionally known in the art and describe a material that binds fibers/tapes together, either by way of its inherent adhesive characteristics or after being subjected to well-known heat and/or pressure conditions. As used herein, a "polymeric" binder or matrix material includes resins and rubber. When such a binder is used in a fiber-based fabric layer, the polymeric binder/matrix material either partially or substantially coats the individual fibers, preferably substantially coating each of the individual filaments/fibers forming a fiber ply or fiber layer, or fully encapsulating each of the individual filaments/fibers forming a fiber ply or fiber layer. When such a binder is used in a tape-based fabric layer, it is not necessary for the binder to substantially coat all surfaces of the tapes or encapsulate the tapes, but rather small amounts of resin may be used as necessary to aid in adhering multiple fabric plies together, which is typically less than 5% by weight of the tape-based fabric layer.

Suitable polymeric binder materials include both low tensile modulus, elastomeric materials and high tensile modulus materials, although low modulus thermoplastic binders are most preferred for the fabric layers of the stab/spike/ballistic resistant panel in order to maximize flexibility. As used herein throughout, the term tensile modulus means the modulus of elasticity, which for polymeric binder materials is measured by ASTM D638. A low or high modulus binder may comprise a variety of polymeric and non-polymeric materials. For the purposes of this disclosure, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature ($T_g$) of the low modulus elastomeric material is preferably less than about 0° C., more preferably the less than about −40° C., and most preferably less than about −50° C. The low modulus elastomeric material also has a preferred elongation to break of at least about 50%, more preferably at least about 100% and most preferably at least about 300%. Whether a low modulus material or a high modulus material, in addition to the colorant, the polymeric binder may also include fillers such as carbon black or silica, may be extended with oils, or may be vulcanized by sulfur, peroxide, metal oxide or radiation cure systems as is well known in the art.

A wide variety of materials and formulations may be utilized as a low modulus polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex., including low modulus polystyrene-polyisoprene-polystyrene block copolymers sold under their trademark KRATON®. Also useful are resin dispersions of styrene-isoprene-styrene (SIS) block copolymer sold under the trademark PRINLIN® and commercially available from Henkel Technologies, based in Düsseldorf, Germany.

High modulus, rigid materials generally have an initial tensile modulus greater than 6,000 psi. Useful high modulus, rigid polymeric binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. Also useful is a thermosetting polymer that is soluble in carbon-carbon saturated solvents such as methyl ethyl ketone, and possessing a high tensile modulus when cured of at least about $1 \times 10^6$ psi (6895 MPa) as measured by ASTM D638. Also useful are the binder materials described in U.S. Pat. No. 6,642,159, the disclosure of which is incorporated herein by reference.

Also useful as binder polymers are polar resins or polar polymers, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably, but not necessarily, cosolvent free. Such includes aqueous anionic polyurethane dispersions, aqueous cationic polyurethane dispersions and aqueous nonionic polyurethane dispersions. Particularly preferred polyurethanes are aqueous anionic polyurethane dispersions; aqueous aliphatic polyurethane dispersions, and most preferred are aqueous anionic, aliphatic polyurethane dispersions, all of which are preferably cosolvent free dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based; polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

When a fabric ply/layer of the disclosure does include a binder, the total weight of the binder of the particular fabric ply/layer preferably comprises from about 2% to about 50% by weight, more preferably from about 5% to about 30%, more preferably from about 7% to about 20%, and most preferably from about 14% to about 20% by weight of the fibers plus the weight of the binder.

Methods for applying a polymeric binder material to fiber-based fabrics, wherein the fiber-based fabrics are impregnated with the binder, are well known and readily determined by one skilled in the art. The term "impregnated" is considered herein as being synonymous with "embedded," "coated," or otherwise applied with a polymeric coating where the polymeric material diffuses into the fabric ply/layer and is not simply on a surface of the ply/layer. Any appropriate application method may be utilized to apply the polymeric binder material and particular use of a term such as "coated" is not intended to limit the method by which it is applied onto the filaments/fibers. Useful methods include, for example, spraying, extruding or roll coating polymers or polymer solutions onto the fibers, as well as transporting the fibers through a molten polymer or polymer solution. Most preferred are methods that substantially coat or encapsulate each of the individual fibers and cover all or substantially all of the fiber surface area with the polymeric binder material. These coating methods are also generally useful for coating tape-based fabric layers with a binder, but as lower quantities are preferred as discussed above, methods such as spraying or roll coating are preferred over methods such as transporting the tapes through a molten polymer or polymer solution.

After combining or stacking together the desired number of fabric plies forming a single fabric layer are coated with the optional binder, they may then be bonded together under pressure, i.e. by low pressure consolidation/lamination or by high pressure molding, to form a composite fabric layer. If a polymeric binder coating is not applied, the plies are to be laminated or molded together using an intermediate adhesive layer. Suitable adhesive include any of those described herein. Alternatively, the adhesive may be in the form of an adhesive web or adhesive scrim which non-exclusively include discontinuous thermoplastic webs, ordered discontinuous thermoplastic nets, non-woven discontinuous adhesive fabrics and non-woven discontinuous adhesive scrims. Most preferred adhesive webs/scrims are heat-activated, non-woven adhesive webs such as SPUNFAB®, commercially available from Spunfab, Ltd, of Cuyahoga Falls, Ohio (trademark registered to Keuchel Associates, Inc.). Also suitable are THERMOPLAST™ and HELIOPLAST™ webs, nets and films, commercially available from Protechnic S.A. of Cernay, France. Of all the above, most preferred is a polyamide web, particularly SPUNFAB® polyamide webs. SPUNFAB® polyamide webs have a melting point of typically from about 75° C. to about 200° C., but this is not limiting.

Once each of the non-uniform and conventional (uniform/substantially uniform) fabric layers of the non-woven stab/spike/ballistic resistant panel are fabricated, the fabric layers may be mechanically joined together only by means such as stitching (e.g., tack stitching), sewing or tack bonding whereby they are not fixed together, or the fabric layers are simply adjoined with each other without any form of attachment, whereby they are preferably held together as a unit within some form of pocket or pouch (e.g., a pouch of rip-stop nylon) or within a polymeric envelope that is weldable (e.g., by radio frequency welding) or heat sealable. The layers are not to be attached by riveting or bolting or another means that fixes the layers in position relative to each other. Methods of stitching are well known in the art and may be conducted using high tenacity threads. See, for example, the stitching method described in U.S. pre-grant patent application 2017/0080678, which is commonly-owned and incorporated herein by reference to the extent consistent herewith.

A suitable polymeric envelope is preferably formed from overlapped and sealed polymeric sheets and may comprise a single or multilayer film structure. Suitable polymers for said polymeric sheets may vary and may comprise, for example, polyolefins or polyamides, such as described in U.S. Pat. Nos. 4,579,756, 5,943,876 or U.S. patent application publication 2012/0148785, which are incorporated herein by reference to the extent consistent herewith. As described in each of these references, a polymeric envelope may be a single or multilayer structure and may be capable of being placed under a vacuum. A preferred polymeric envelope comprises a heat-seal layer formed from a polymer such as very low density polyethylene (VLDPE), low density polyethylene (LDPE), linear low density polyethylene (LLDPE), high density polyethylene (HDPE), metallocene polyethylene (mPE), metallocene linear low density polyethylene (mLLDPE), ethylene vinyl acetate (EVA) copolymer, ethylene-propylene (EP) copolymer or ethylene-propylene-butene (EPB) terpolymers, or combinations thereof or multilayer films including multiple layers of said polymers. Said heat seal layers may be uniaxially or biaxially stretched. Useful polymeric envelopes may further include gas-barrier layers formed on the heat-seal layer, for example one layer or multiple layers of metal or oxide thereof which is formed on one side or both sides of the heat seal polymer substrate. Other useful additional layers non-exclusively include one or more polyethylene terephthalate (PET) layers, polybutylene terephthalate (PBT) layers, polyimide (PI) layers, ethylene/vinyl alcohol (EVOH) copolymer layers, one or more polyvinylidene chloride layers, one or more polyvinyl alcohol layers, or a combination thereof. Other polymeric envelopes may be metallized with aluminum, aluminum oxide or laminated with a metallic foil to which may provide an added secondary benefit of partially reflecting part shock wave energy in the event that the wearer encounters an explosion or blast. Such a foil layer would comprise any known useful metallic foil, such as an aluminum foil, copper foil or nickel foil as determined by one skilled in the art.

A preferred fabric pouch is formed from a ripstop woven fabric, preferably a rip-stop woven nylon fabric. Rip-stop fabrics are known in the art and are typically made by weaving nylon threads throughout a base material in interlocking patterns. These fabrics are very resistant to tearing and ripping. A particularly preferred fabric pouch material is a rip-stop woven nylon fabric which is formed from 70 denier nylon fibers and has a weight of 95 g/m$^2$ and is typically coated with a polyurethane resin on at least one its surfaces. The ripstop pouch itself may be sealed closed via conventional means in the art, such as stitching.

It is a further aspect of this disclosure that the stab/spike/ballistic resistant panel may be formed into a ballistic resistant, stab/spike resistant composite material by adjoining or connecting a first panel comprising the stab/spike/ballistic resistant panel to a second panel comprising a plurality of fabric layers that have been consolidated, wherein the first panel and the second panel are connected but are not fixed in position relative to each other. Each of the fabric layers of the second panel comprise a plurality of high tenacity fibers and/or a plurality of high tenacity tapes having the preferred properties described above, e.g., a tenacity of about 7 g/denier or more and a tensile modulus of about 150 g/denier or more. Each of said fibers/tapes also have surfaces that are coated with a polymeric binder composition or adhesive polymer film to aid in consolidating the fabric plies together.

While the first panel must be non-woven, the second panel may comprise any type of uni-axial or multi-axial fabric structure, including woven fabrics, non-woven unidirectional fabrics, non-woven felt fabrics, knit fabrics, or a combination thereof. In this regard, a fabric layer of the second panel may comprise a single woven fabric ply, a plurality of non-consolidated woven fabric plies, a plurality of consolidated woven fabric plies, a single non-woven fabric ply, a plurality of non-consolidated non-woven unidirectional fabric plies, a plurality of consolidated non-woven unidirectional fabric plies, one or more felt plies (i.e., non-woven randomly oriented fibers), one or more knit plies, etc. In this regard, woven fabrics may be formed using techniques that are well known in the art using any fabric weave, such as plain weave, crowfoot weave, basket weave, satin weave, twill weave, three dimensional woven fabrics, and any of their several variations. Plain weave is most common, where fibers/tapes are woven together in an orthogonal 0°/90° orientation with warp fibers/tapes oriented perpendicular to weft (fill) fibers/tapes, and is preferred. The warp and weft (fill) count, known in the art as a "pick count" or "mesh count," is a measure of the density of the woven fabric. Plain weave fabrics may have an equal or unequal warp and weft count. In this regard, preferred first fibrous materials have a preferred pick count of from about 20 ends per inch to about 80 ends per inch in each of the warp and weft directions, more preferably from about 25 ends per inch to about 70 ends per inch in each of the warp and weft directions, and most preferably from about 25 ends per inch to about 60 ends per inch in each of the warp and weft directions. Preferred second fibrous materials have a preferred pick count of from about 15 ends per inch to about 70 ends per inch in each of the warp and weft directions, more preferably from about 20 ends per inch to about 60 ends per inch in each of the warp and weft directions, still more preferably from about 20 ends per inch to about 50 ends per inch in each of the warp and weft directions, and most preferably from about 25 ends per inch to about 40 ends per inch in each of the warp and weft directions.

Knit fabric structures are typically formed from fibers rather than tapes and are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The fibers are very straight without the crimp effect found in woven fabrics due to the interlacing effect on the yarns. These laid in yarns can be oriented in a monoaxial, biaxial or multi-axial direction depending on the engineered requirements. It is preferred that the specific knit equipment used in laying in the load bearing yarns is such that the yarns are not pierced through.

Felts are also formed from fibers rather than tapes and may be formed by one of several techniques known in the art, such as by carding or fluid laying, melt blowing and spin laying. A felt is a non-woven network of randomly oriented fibers, preferably at least one of which is a discontinuous fiber, preferably a staple fiber having a length ranging from about 0.25 inch (0.64 cm) to about 10 inches (25.4 cm).

In forming the second panel, a plurality of fabric plies may be merged together according to conventional methods in the art to form each individual fabric layer prior to coupling pairs of fabric layers. In this regard, as also described already above, a plurality of single plies of the selected fabric ply type are stacked on top of each other in coextensive fashion and merged, i.e. consolidated, together. Each fabric layer preferably includes from about 1 to about 100 fabric plies, more preferably from about 2 to about 85 fabric plies, and most preferably from about 2 to about 65 fabric plies. When the second panel comprises a plurality of unidirectional non-woven fibrous plies, as noted above, it is typical for a plurality of such plies to first be formed into a 2-ply or 4-ply unidirectional non-woven fiber "pre-preg" or "pre-preg layer," prior to combining a plurality of such "pre-pregs" or "pre-preg layers" together to form the section. Each pre-preg typically includes from 2 to about 6 fibrous plies, typically wherein adjacent layers are cross-plied at an angle relative to the longitudinal fiber direction of adjacent plies (e.g., orthogonal, 0°/90°), but may include as many as about 10 to about 20 fibrous plies as may be desired for various applications, with each pre-preg also preferably being cross-plied relative to other pre-pregs at alternating 0°/90° orientations. For example, a four ply pre-preg may have plies oriented at 0°/90°/0°/90°. Other fabric constructions are also acceptable. For example, a five ply non-woven unidirectional structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith. With particular regard to fibrous materials comprising one or more woven fibrous plies, it is also typical for the warp and weft component fibers forming a single fibrous material to be oriented orthogonally to each other When the second panel comprises a plurality of non-woven unidirectional fiber pre-pregs, the panel preferably comprises from 2 to about 100 pre-pregs, more preferably from about 2 to about 85 pre-pregs, and most preferably from about 2 to about 65 pre-pregs, each of which preferably comprises two unidirectional cross-plied plies. The plies forming each pre-preg are typically merged together with a polymeric binder, as discussed above. Additionally, the fabric plies/layers of the second panel are fabricated with the same high tenacity fiber type options, the same polymeric binder material options, and the same consolidation methods as described above, but without spacer elements being provided between fabric layers. A lower binder content is appropriate for woven and knitted fibrous layers, wherein a polymeric binder content of greater than zero up to about 12% by weight of the fibers plus the weight of the binder is typically most preferred, but this is not intended as strictly limiting. In this regard, weaving or knitting of fabrics is typically performed prior to coating the fibers of a woven or knit fabric with a polymeric binder, wherein the fabrics are thereafter impregnated with the binder.

Merging of the fabric plies/layers into single-layer composite structures may be accomplished using conventional techniques in the art, which as noted above includes both low pressure consolidation techniques and high pressure molding techniques, with or without heat. In the preferred embodiments, a stack of overlapping fabric plies/layers is merged under heat and pressure, or by adhering the coatings of individual fibrous plies to each other, to thereby form a single-layer, monolithic element. Methods of consolidating fibrous plies/layers are well known, such as by the methods described in U.S. Pat. No. 6,642,159. Although, as noted above, consolidation can occur without pressure via drying, cooling, heating or a combination thereof, pressurized consolidation is preferred for optimum bonding of the layers. In this regard, consolidation may be performed at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that a present polymeric binder coating can be caused to stick or flow without completely melting. Generally, if the polymeric binder material is caused to melt, relatively little pressure is required to form the composite, while if the binder material is only heated to a sticking point more pressure is typically required. As is conventionally known in the art, consolidation may be conducted in a calender set, a flat-bed laminator, a press or in an autoclave. Consolidation may also be conducted by vacuum molding the material in a mold that is placed under a vacuum. Vacuum molding technology is well known in the art. Most commonly, a plurality of orthogonal fiber webs are "glued" together with the binder polymer and run through a flat-bed laminator to improve the uniformity and strength of the bond.

High pressure merging of the fabric plies/fabric layers may be achieved by molding under heat and pressure in a suitable molding apparatus at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the fabric plies/fabric layers are molded has a direct effect on the stiffness or flexibility of the resulting molded product. Particularly, the higher the pressure at which they are molded, the higher the stiffness, and vice-versa. In addition to the molding pressure, the quantity, thickness and composition of the fibrous plies and polymeric binder coating type also directly affects the stiffness of composite.

While each of the molding and consolidation techniques described herein are similar and the terms are often used interchangeably in the art, "molding" as used herein specifically refers to a method of merging by bonding fabric plies/layers together in a batch process, while "consolidation" refers to a method of merging by bonding fabric plies/layers together in a generally continuous process. Further, molding typically involves the use of a mold, such as a shaped mold or a match-die mold when forming a flat panel, and does not necessarily result in a planar product. Normally consolidation is done in a flat-bed laminator, in a double belt or steel belt press, in a calendar nip set or by wet lamination to produce soft (flexible) body armor fabrics. In addition, molding is typically performed under relatively high pressure, while consolidation is typically performed under relatively low pressure, as discussed above. However, this is not intended to be strictly limiting and molding procedures, such as vacuum molding or autoclave molding, are often performed at relatively low pressures as determined by one skilled in the art. In either process, suitable temperatures, pressures and times are generally dependent on the type of polymeric binder coating materials, polymeric binder content, process used and fiber type.

The fabric layers of the stab/spike/ballistic resistant panel (first panel) and the fabric layers of the second panel may be formed from identical materials or from different materials. For example, in a preferred embodiment, the stab/spike/ballistic resistant first panel comprises polyethylene fibers and said second panel comprises aramid fibers.

In preferred embodiments, the first panel and said second panel are tack stitched or tack bonded together and wherein said first panel and said second panel are at least partially spaced from each other by the protrusions from a non-uniform fabric layer being positioned as an outermost layer of the stab/spike/ballistic resistant panel so that the protrusions at least partially space the second panel apart from the first, stab/spike/ballistic resistant panel.

In order to further improve the durability of the composites of the disclosure, without forming an article having excessive weight, it is also preferred that each fabric layer of the disclosure has an areal density of about 400 $g/m^2$ or less, more preferably about 300 $g/m^2$ or less, still more preferably about 200 $g/m^2$ or less, still more preferably about 150 $g/m^2$ or less, still more preferably about 125 $g/m^2$ or less, still more preferably about 115 $g/m^2$ or less, still more preferably about 110 $g/m^2$ or less, still more preferably about 105 $g/m^2$ or less, still more preferably about 100 $g/m^2$ or less, and most preferably about 95 $g/m^2$ or less, with most preferred areal density ranges of from about 15 $g/m^2$ to about 95 $g/m^2$ or from about 30 $g/m^2$ to about 95 $g/m^2$. In a particularly preferred embodiment, the stab/spike/ballistic resistant panel has an areal density of from about 15 $g/m^2$ to about 110 $g/m^2$, more preferably from about 30 $g/m^2$ to about 110 $g/m^2$, and the second panel has an areal density of from about 200 $g/m^2$ to about 400 $g/m^2$. In preferred embodiments, the sum of the stab/spike/ballistic resistant panel and the second panel any additional optional layers or materials produces a composite material having a total combined areal density of from about 60 g/m² to about 800 g/m², more preferably from about 100 g/m² to about 600 g/m², and most preferably from about 200 g/m² to about 500 g/m².

In view of the above, the thickness of each fibrous material section will generally correspond to the thickness of the individual fibers and the number of fiber plies/layers incorporated into the composite. A preferred woven fabric, knitted fabric or felted non-woven fabric will have a preferred thickness of from about 25 µm to about 600 µm per ply/layer, more preferably from about 50 µm to about 385 µm and most preferably from about 75 µm to about 255 µm per ply/layer. A preferred two-ply unidirectional non-woven fabric composite will have a preferred thickness of from about 12 µm to about 600 µm, more preferably from about 50 µm to about 385 µm and most preferably from about 75 µm to about 255 µm.

Any of the fabric layers or panels may have a polymeric film attached to one or more of their surfaces, which may be attached before or after any consolidation steps and before or after adjoining/connecting panels together. In these embodiments, particularly preferred polymer films non-exclusively include thermoplastic polymer layers including polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Such thermoplastic polymer layers are preferably very thin, having preferred layer thicknesses of from about 1 µm to about 250 µm, more preferably from about 5 µm to about 25 µm and most preferably from about 5 µm to about 9 µm. While such thicknesses are preferred, it is to be understood that other thicknesses may be produced to satisfy a particular need and yet fall within the scope of the present disclosure. Such thermoplastic polymer layers may be bonded to the composite surfaces using well known techniques, such as thermal lamination (exemplary conditions described above). Additionally, as an alternative to a polymeric film, one or more surfaces of a fabric layer may be coated with protective coating, such as a coating providing water repellent properties. Suitable coatings non-exclusively include natural rubber, polyvinyl chloride, polyurethane, silicone elastomers, fluoropolymers, and waxes, as would be determined by one skilled in the art. Particularly preferred water resistant polymer coatings non-exclusively include fluoropolymer based coatings, such as OLEOPHOBOL™ water repellent agents commercially available from Huntsman LLC of Salt Lake City, Utah, and polyurethane coatings.

The stab/spike/ballistic resistant composite materials of this disclosure are particularly useful for the fabrication of flexible body armor, especially body armor vests or tactical vest covers having stab, spike and ballistic resistance. One example of a bullet-resistant vest, of many known in the art, is shown in U.S. Pat. No. 5,398,340, the disclosure of which is incorporated herein by reference to the extent not inconsistent herewith. The vests of U.S. Pat. No. 5,398,340 include a woven fabric shell or cover which contains compartments or pockets into which are inserted panels of impact absorbing antiballistic materials. In accordance with the present disclosure, a similar vest design may be produced but with the woven material of U.S. Pat. No. 5,398,340 being replaced by the non-woven, stab/spike/ballistic resistant panel of the present disclosure, or optionally, with the non-woven, stab/spike/ballistic resistant panel of the present disclosure being incorporated in said design as the front, outermost, strike face layer of the vest. Another known vest construction is described in U.S. Pat. No. 7,200,871 to Safariland LLC of Jacksonville, Fla., which is incorporated herein by reference to the extent consistent herewith, which teaches Advanced Webless System (AWS) vest constructions that are alternatives to conventional Modular Lightweight Load-carrying Equipment (MOLLE). In any vest/vest cover construction of this disclosure, a stab/spike/ballistic resistant fabric or panel is to be positioned as the outermost, strike face panel of the vest/vest cover so that it is the first to engage a projectile or sharp object, thereby providing the first defense against harm to the user. In another embodiment, the stab/spike/ballistic resistant materials of this disclosure may be positioned within a cover and inserted into pockets or compartments of existing ballistic resistant articles, such as described in U.S. Pat. No. 9,562,744, which is also incorporated herein by reference to the extent consistent herewith. However, all of these applications are not intended to be limiting and the stab/spike/ballistic resistant articles may be applied in generally any application where stab/spike/ballistic resistance is desired.

It has also particularly been found that exceptional stab, spike and ballistic resistance is achieved when coupling a non-uniform layer 30 of FIG. 3 or non-uniform layer 40 of FIG. 4 with a 2-ply 0°/90° fabric layer 20 as illustrated in FIG. 2 or a ±45° layer or a combination thereof, thereby forming a multi-ply element having, for example, a 0°/90°/0° non-uniform ply/+45°/−45° configuration. In another embodiment, each non-uniform ply may be attached to single ply having orthogonal fibers, for example, a 90°/0° non-uniform ply/90° structure. Other configurations are also acceptable provided that coupled layers are cross-plied. Exemplary acceptable configurations non-exclusively include a +45°/−45°/0° non-uniform ply/90° configuration or a +45°/−45°/90° non-uniform ply/0° configuration. A plurality of adjoined layers 30 (or 40) and 20 may be stacked together to form a more complex structure, whereby layers 20 and 30 (or 40) alternate. In each of the above alternating stacked configurations, each of layers 20 and 30 (or 40) may comprise the same fiber type or different fiber types. In one preferred embodiment, each non-uniform layer is formed from UHMWPE polyethylene fibers and each 0°/90° layer 20 (or individual 0° or 90° plies, if incorporated individually) is formed from aramid fibers. In another preferred embodiment, each 0°/90° layer 20 (or individual 0° or 90° plies, if incorporated individually) is formed from UHMWPE polyethylene fibers and each non-uniform layer is formed from aramid fibers.

In another preferred embodiment, stab/spike/ballistic resistance of the articles of this disclosure may be even further supplemented by combining the stab/spike/ballistic resistant panels of this disclosure with commercially available stab resistant fabrics such as woven MicroFlex™ fabrics commercially available from Teijin Aramid B.V. of the Netherlands or KEVLAR® Correctional™ fabrics commercially available from E. I. du Pont de Nemours and Company of Wilmington, Del. In an exemplary structure, a plurality of alternating layers 20 and 30 (or 40), such as shown above, are adjoined with a stack of MicroFlex™ and/or KEVLAR® Correctional™ fabrics. In yet another embodiment, the ballistic resistance of stab/spike/ballistic resistant articles of this disclosure may be further enhanced by incorporating layers of SPECTRA SHIELD® fabrics, commercially available from Honeywell International Inc. of Morris Plains, N.J., either with or without incorporating layers of commercially available stab resistant fabrics such as MicroFlex™ and/or KEVLAR® Correctional™ fabrics. Irrespective of the number and type of fabric layers, the combined layers are most preferably loosely stacked together without any form of attachment, preferably being held together within a pouch (e.g., fabric pouch of rip-stop nylon) or polymeric envelope.

The following non-limiting Examples serve to illustrate the preferred embodiments of this disclosure.

Example 1

Several identical 38.1 cm×38.1 cm square stab/spike/ballistic resistant flexible packs are prepared for spike and stab testing. Each pack is formed by stacking together a group of layers of fabric A and a group of layers of fabric B. The layers in the stacks are not bonded to each other but are held together by taping together the four edges of the packs with generic commercially available packaging tape to hold the layers in the proper orientation during testing.

Each layer of fabric A is a non-uniform layer comprised of a single sheet (single ply) of non-woven, axially oriented (unidirectional) fibers having a non-uniform thickness and non-uniform areal density. The fibers are high strength, high modulus aramid fibers and the coated with a thermoplastic polyurethane polymer. The aramid fibers are manufactured by Teijin Inc. and have a breaking strength of 267 N and a Chord modulus of 91 GPa. Each A layer comprises 85% by weight of the fiber and 15% by weight of the polyurethane polymer based on the total weight of the fabric layer. The fabric ply has thick portions and thin portions, wherein the areal density of said thick portions is about 3 times greater than the areal density of said thin portions. Each of these portions extend axially down the fabric, along the entire length of the fabric, with each thick portion being about 10 mm wide transversely across the width of the fabric layer and each thin portion being about 40 mm wide transversely across the width of the fabric layer. The non-uniform layer has a front surface and a rear surface, and each of the thick portions individually protrude from both of the surfaces in the form of ridges along the entire length of the fabric layer as illustrated in FIG. 3 (top view) and FIG. 5 (side view). The polyurethane coating is dried and the protruding axial ribs/ridges are maintained in place. The average areal density of each individual A layer is approximately 120 g/m$^2$, with the thick areas having an areal density of about 45 g/m$^2$ and the thin areas having an areal density of about 15 g/m$^2$.

Each layer of fabric B comprises a consolidated network having two sheets (plies) of non-woven, uniformly spread, axially oriented (unidirectional) high strength and high modulus aramid fibers impregnated with a thermoplastic polyurethane polymer. The aramid fibers are the same high strength, high modulus aramid fibers from Teijin Inc. as used for fabric A, and they are coated with the same thermoplastic polyurethane polymer. Adjacent layers are cross-plied at right angles to each other at angles of +45°/−45°. Each B layer comprises 85% by weight of the fiber and 15% by weight of the polyurethane polymer based on the total weight of the fabric layer. The areal density of each 2-ply B layer is 120 g/m$^2$.

A stack is then formed including alternating layers of fabric A and fabric B, the stack including 22 layers of fabric A and a single 2-ply layer of fabric B being placed on each surface of each fabric A (B/A/B/A/B . . . ), such that the stack includes one more layer of fabric B than fabric A, i.e., 23 total layers of fabric B. The layers in the stacks are not bonded to each other but are held together by taping together the four edges of the packs with generic commercially available packaging tape to hold the layers in the proper orientation during stab, spike and ballistic testing. Every other layer of fabric A is rotated by 90° so that the direction of the fibers are not all in the same axial direction (fabric B/0° fabric A/fabric B/90° fabric A/fabric B/0° fabric A/fabric B/90° fabric A/etc).

Each of these samples is then to be subjected to stab and spike testing as per National Institute of Justice (NIT) test Standard 0115.00 with a P1A blade (Average tip of knife sharpness: 58 HRC) and was conducted in accordance with the Protection Level 1 (Threat Level: P1, Level 1), strike energy level E2 (36J) as specified in said NIJ standard, with a drop mass of 1.91 kg with the passing criteria for the stab test at E2 strike energy being a maximum of 20 mm knife blade penetration and the passing criteria for the spike test at E2 strike energy also being a maximum of 20 mm penetration. All samples are expected to fully meet the passing criteria.

Example 2

An identical 38.1 cm×38.1 cm square flexible pack of this disclosure as produced in Example 1 is subjected to flexibility testing and compared to a commercially available stab resistant material (from Barrday, Inc. of Cambridge, Ontario, Canada) comprising a woven, coated aramid fabric. The comparative test sample was prepared by stacking 29 layers of the material and taping the edges of the stack as done for the new material of this disclosure. The flexibility test consists of flexing the test samples through an opening of approximately 100-mm (4 inches) and measuring extension (deflection) of the material when impacted with a metal ball plunger having a diameter of approximately 25 mm (1 inch). The plunger is lowered down to fabric extensions of 12.5 mm, 25 mm and 37 mm and the force required to reach these levels of fabric extension was measured by an Instron testing machine (Model 4505) to compare levels of flexibility of the two materials, both of which had identical areal densities of 5 kg/m$^2$. Each of the flexible pack of this disclosure and the comparative specimen have equal areal densities of 5.40 kg/m$^2$, and the new material of this disclosure is expected to have a stiffness of more than 20% less than the comparative material.

Example 3

Three additional flexible packs of this disclosure similar to those formed in Example 1 are subjected to ballistic testing, except each pack has an areal density of 3.80 kg/m$^2$. Each pack is subjected to ballistic testing separately on a calibrated clay backing against 9 mm, 127 grain FMS Remington bullets following National Institute of Justice test Standard NIJ 0101.06. Several of the bullets are fired to determine the industry standard $V_{50}$ velocity for the material where half of the bullets were fired at a velocity to penetrate the shoot pack and the other half were fired at a reduced velocity so that bullets did not penetrate the shoot pack. The average $V_{50}$ value of each of the three shoot packs is expected to be greater than 350 m/s.

Example 4

Example 3 is repeated except the shoot packs are assembled into C3 vests and 10 layers of SPECTRA SHIELD® SA-3118 fabric (of Honeywell International Inc., Morris Plains, N.J.) are attached to the back of vest, which is expected to result in a further improved $V_{50}$ velocity relative to the combination of fabrics A and B alone.

Example 5

Example 3 is repeated except the shoot packs are assembled into C3 vests and 10 layers of GOLD SHIELD® GN-2117 fabric (of Honeywell International Inc., Morris Plains, N.J.) are attached to the back of vest, which is expected to result in a further improved $V_{50}$ velocity relative to the combination of fabrics A and B alone.

While the present disclosure has been particularly shown and described with reference to preferred embodiments, it will be readily appreciated by those of ordinary skill in the art that various changes and modifications may be made without departing from the spirit and scope of the disclosure. It is intended that the claims be interpreted to cover the disclosed embodiments, those alternatives which have been discussed above and all equivalents thereto.

What is claimed is:

1. A non-woven, stab, spike and ballistic resistant panel comprising a plurality of non-woven fabric layers, each of said non-woven fabric layers comprising a plurality of axially oriented multifilament fibers and wherein at least one of said non-woven fabric layers is a non-uniform layer having a non-uniform thickness, wherein said non-uniform layer has thick areas and thin areas, wherein the thick areas have a higher filament concentration than the thin areas, wherein the areal density of said thick areas is greater than the areal density of said thin areas, wherein each non-uniform layer has a front surface and a rear surface, wherein each of said thick areas individually protrude from at least one of said surfaces.

2. The non-woven, stab, spike and ballistic resistant panel of claim 1 wherein each non-uniform fabric layer has a front surface and a rear surface, wherein each of said thick areas individually protrude from both of said surfaces.

3. The non-woven, stab, spike and ballistic resistant panel of claim 1 wherein said thick areas have an areal density of at least two times the areal density of the thin areas.

4. The non-woven, stab, spike and ballistic resistant panel of claim 1 wherein said thick areas comprise axial ridges extending along the entire length of said panel.

5. The non-woven, stab, spike and ballistic resistant panel of claim 4 wherein said axial ridges are laterally spaced apart from each other across the width of said panel.

6. The non-woven, stab, spike and ballistic resistant panel of claim 5 wherein said axial ridges each individually protrude from both said front surface and said rear surface.

7. The non-woven, stab, spike and ballistic resistant panel of claim 1 wherein said plurality of non-woven fabric layers of said panel consists essentially of two non-woven fabric layers, wherein said non-woven fabric layers are coupled together such that they are coupled fabric layers, said coupled fabric layers comprising a first non-uniform layer and a second non-uniform layer that are coupled together whereby they are not fixed in position relative to each other, wherein said coupled fabric layers have opposing surfaces that are at least partially spaced from each other by said protruding thick areas between said coupled fabric layers.

8. The non-woven, stab, spike and ballistic resistant panel of claim 7 wherein each of said non-woven fabric layers of the panel comprises a plurality of unidirectionally oriented fibers.

9. The non-woven, stab, spike and ballistic resistant panel of claim 8 wherein the fibers of said coupled fabric layers are cross-plied, wherein the unidirectionally oriented fibers of said first non-uniform fabric layer are oriented at an angle of about 90° relative to the unidirectionally oriented fibers of a second non-uniform fabric layer.

10. The non-woven, stab, spike and ballistic resistant panel of claim 7 wherein the opposing surfaces of said coupled fabric layers are partially separated from each other and partially in contact with each other.

11. The non-woven, stab, spike and ballistic resistant panel of claim 7 wherein the opposing surfaces of said coupled fabric layers are completely separated from each other.

12. The non-woven, stab, spike and ballistic resistant panel of claim 7 wherein said protruding thick areas separate the opposing surfaces of said coupled fabric layers from each other by from about 0.001 mm to about 0.5 mm along part of or along all of the interfaces of said opposing surfaces.

13. The non-woven, stab, spike and ballistic resistant panel of claim 1 wherein each of said non-woven fabric layers comprises a plurality of fibers having a tenacity of about 7 g/denier or more and a tensile modulus of about 150 g/denier or more and wherein each of said fibers are coated with a polymeric binder material.

14. The non-woven, stab, spike and ballistic resistant panel of claim 8 further comprising at least one additional non-uniform fabric layer coupled with said second non-uniform fabric layer, wherein said non-woven fabric layers are not fixed in position relative to each other and wherein said non-woven fabric layers have opposing surfaces that are at least partially spaced from each other by said protruding thick areas between said coupled fabric layers.

15. A stab, spike and ballistic resistant garment formed from the non-woven, stab, spike and ballistic resistant panel of claim 8.

16. A stab, spike and ballistic resistant article comprising a first non-woven, stab, spike and ballistic resistant panel of claim 1 and a second non-woven, stab, spike and ballistic resistant panel of claim 1, wherein the second panel is adjoined with the first panel, the first panel comprising two coupled fabric layers, said coupled fabric layers comprising a first non-woven, non-uniform fabric layer and a second non-woven, non-uniform fabric layer that are coupled together whereby they are not fixed in position relative to each other, wherein each non-uniform fabric layer has a front surface and a rear surface and each non-uniform layer has thick areas and thin areas, wherein the thick areas have a higher filament concentration than the thin areas, wherein the areal density of said thick areas is greater than the areal density of said thin areas, wherein said thick areas protrude from at least one surface of each non-uniform fabric layer, wherein said coupled fabric layers have opposing surfaces that are at least partially spaced from each other by said protruding thick areas between said coupled fabric layers, and the second panel comprising a plurality of fabric layers, said plurality of fabric layers being consolidated; each of the fabric layers comprising a plurality of multifilament fibers, said fibers having a tenacity of about 7 g/denier or more and a tensile modulus of about 150 g/denier or more; each of said fibers having a surface, and the surfaces of said fibers being coated with a polymeric composition; and wherein the first panel and the second panel are adjoined but are not fixed in position relative to each other with an adhesive.

17. The stab, spike and ballistic resistant article of claim 16 wherein said first panel and said second panel are at least partially spaced from each other by said protruding thick areas.

18. The stab, spike and ballistic resistant article of claim 16 wherein said second panel comprises a consolidated plurality of non-woven fabrics.

19. The non-woven, stab, spike and ballistic resistant panel of claim 1 wherein said panel comprises two non-woven fabric layers, wherein said non-woven fabric layers are coupled together such that they are coupled fabric layers, said coupled fabric layers comprising a first non-uniform layer and a second non-uniform layer that are coupled together by stitching, sewing or tack bonding, wherein said coupled fabric layers have opposing surfaces that are at least partially spaced from each other by said protruding thick areas between said coupled fabric layers.

20. The stab, spike and ballistic resistant article of claim 16 wherein said first panel and said second panel are coupled together by stitching, sewing or tack bonding.

\* \* \* \* \*